US012239610B2

(12) United States Patent
Gabriel et al.

(10) Patent No.: US 12,239,610 B2
(45) Date of Patent: Mar. 4, 2025

(54) FEEDING TUBE WITH INFLATABLE BALLOON COMPONENT AND AT LEAST ONE OF A CARBON DIOXIDE SAMPLING LINE AND A SUCTION TUBE COMPONENT

(71) Applicant: SYNCRO MEDICAL INNOVATIONS, INC., Macon, GA (US)

(72) Inventors: Sabry Gabriel, Lizella, GA (US); Samy Gabriel, Lizella, GA (US)

( * ) Notice: Subject to any disclaimer, the term of this patent is extended or adjusted under 35 U.S.C. 154(b) by 545 days.

(21) Appl. No.: 17/234,926

(22) Filed: Apr. 20, 2021

(65) Prior Publication Data

US 2021/0322280 A1 Oct. 21, 2021

Related U.S. Application Data

(60) Provisional application No. 63/012,537, filed on Apr. 20, 2020.

(51) Int. Cl.
*A61J 15/00* (2006.01)

(52) U.S. Cl.
CPC ....... *A61J 15/0088* (2015.05); *A61J 15/0007* (2013.01); *A61J 15/0049* (2013.01)

(58) Field of Classification Search
CPC ................ A61J 15/0088; A61J 15/0007; A61J 15/0049; A61J 15/0096; A61J 15/0069; A61J 15/0092; A61J 15/0003; A61J 15/0073; A61J 15/0084; A61J 15/00; A61M 2016/0413; A61M 16/0411
See application file for complete search history.

(56) References Cited

U.S. PATENT DOCUMENTS 1,211,928 A * 1/1917 Fisher ................. A61M 3/0283 604/40
5,078,701 A * 1/1992 Grassi ................. A61J 15/0073 604/270
9,713,578 B2 7/2017 Gabriel
10,258,542 B2 4/2019 Elia
2003/0109848 A1 * 6/2003 Fleeman ............. A61J 15/0088 604/77
2009/0209832 A1 * 8/2009 McDaid .............. A61J 15/0088 600/302
2013/0245542 A1 * 9/2013 Kuhn .................. A61J 15/0088 604/28
2014/0180252 A1 * 6/2014 Gabriel .............. A61B 17/3415 604/99.04

(Continued)

OTHER PUBLICATIONS

The Gabriel Feeding Tube, 2018, New England Medical Specialties, p. 1 (Year: 2018).*

(Continued)

*Primary Examiner* — Amber R Stiles

(57) ABSTRACT

A feeding tube with an inflatable balloon component and at least one of (1) a carbon dioxide ($CO_2$) sampling line, (2) a suction tube component, (3) a pH sensor, and (4) an electromagnetic sensor is disclosed. A kit containing the feeding tubing and at least one of (1) a carbon dioxide ($CO_2$) sampling line, (2) a suction tube component, (3) a pH sensor, and (4) an electromagnetic sensor, and a method for intubating a patient to deliver the feeding tube to a desired location for delivering nutrients and/or medication to the patient are also disclosed.

3 Claims, 15 Drawing Sheets

(56) References Cited

U.S. PATENT DOCUMENTS

| | | | | |
|---|---|---|---|---|
| 2018/0078195 | A1 | 3/2018 | Sutaria et al. | |
| 2019/0183741 | A1 | 6/2019 | Gabriel | |
| 2019/0224434 | A1 * | 7/2019 | Silver | A61H 31/00 |

OTHER PUBLICATIONS

Gabriel, Development and Technology Transfer of the Syncro Blue Tube (Gabriel) Magnetically Guided Feeding Tube, Jun. 2017, Syncro Medical Innovations, Inc., pp. 11 and 20 (Year: 2017).*

PCT/US2021/028071 International Search Report and Written Opinion, Jul. 8, 2021.

* cited by examiner

FEEDING TUBE WITH INFLATABLE BALLOON COMPONENT AND AT LEAST ONE OF A CARBON DIOXIDE SAMPLING LINE AND A SUCTION TUBE COMPONENT

CROSS-REFERENCE TO RELATED APPLICATIONS

This patent application claims the benefit of priority to U.S. Provisional Patent Application Ser. No. 63/012,537 filed on Apr. 20, 2020 and entitled "FEEDING TUBE WITH INFLATABLE BALLOON COMPONENT AND AT LEAST ONE OF A CARBON DIOXIDE SAMPLING LINE AND A SUCTION TUBE COMPONENT," the subject matter of which is hereby incorporated by reference in its entirety.

TECHNICAL FIELD

The present invention relates to medical catheters, particularly for use as feeding tubes.

BACKGROUND

Early, safe enteral nutrition provides several benefits to critically ill patients, including more rapid healing, faster weaning from mechanical ventilation, fewer infections, and shorter hospital stays. A number of feeding tube devices have been developed over the years for the purpose of providing food and nutrients to a patient, such as into a patient's duodenum. For example, U.S. Pat. No. 5,431,640 issued to Gabriel, discloses a catheter guided by an external magnet so as to advance the catheter into the patient's duodenum. In addition, U.S. Pat. No. 6,126,647 issued to Posey et al. discloses a catheter guided by an external magnet, which contains a sensor that indicates whether the distal end of the catheter is being properly advanced into the patient's duodenum. The catheter contains a magnet that is permanently affixed in the distal portion of the catheter.

One current FDA approved device (i.e., the Gabriel Feeding Tube) uses an external magnet to direct duodenal intubation by a feeding tube with a magnet embedded in its tip. A light indicator at the proximal end of the feeding tube, connected to a magnetic field sensor at the distal end, provides confirmation to the operator that the magnet has been captured. In a study previously conducted at the Medical Center of Central Georgia, the enteral feeding tube with light indicator was reliably placed into the distal duodenum in an average of 17 minutes, with 87% success rate in the first attempt. This intubation technique did not require fluoroscopy, endoscopy, or medications. Most of the 17 minutes were used to manipulate the tube from the first part of the duodenum to the 4th part of the duodenum. No attempts were made for deeper placements than 4th part of the duodenum as the anatomy is variable in different patients and even in the same patient at different times due to redundant omental attachment of the small intestine.

Risk associated with feeding directly into a patient's stomach is aspiration into the lungs. To minimize this risk, the tip of the feeding tube is advanced distally, ideally beyond the ligament of Treitz. Critically ill patients often have gastroparesis, but their small bowel function usually remains normal. Therefore, nasoenteral feeding in the distal duodenum can allow provision of daily caloric needs without the interruption required by gastric residuals. Unfortunately, placing enteral feeding tubes beyond the pyloric sphincter and even further into the duodenum is difficult. Many currently available tubes coil up in the gastric fundus.

U.S. Pat. No. 9,713,578 issued to Gabriel addressed many of the problems discussed above. U.S. Pat. No. 9,713,578 discloses a feeding tube apparatus comprising a catheter suitable for use with a removable stylet, the catheter comprising a catheter proximal end, a catheter distal end opposite the catheter proximal end, a catheter channel extending along a length of the catheter from the catheter proximal end towards the catheter distal end, and an inflatable balloon component positioned along the catheter proximate the catheter distal end.

Misplacement of the catheter within a patient's trachea can cause trauma to the patient; consequently, quick detection of misplacement of the catheter within a patient's trachea is important during intubating the patient, especially unresponsive patients.

There is a need in the art for improved feeding tube devices that easily enter into and advance through a patient's duodenum, as well as provide quick detection of misplacement of the catheter within a patient's trachea or lung during intubation. Further, in burn and critically ill patients, there is a need to empty and decompress the stomach while feeding in the small intestine.

SUMMARY

The present invention addresses a need in the feeding tube art by providing an improved feeding tube apparatus that comprises one or more of: (1) a carbon dioxide ($CO_2$) sampling line, (2) a suction tube component, (3) a pH sensor, and (4) an electromagnetic sensor. When present, the carbon dioxide ($CO_2$) sampling line comprises a carbon dioxide ($CO_2$) sampling line that is connectable to a catheter or stylet of the improved feeding tube apparatus, wherein the carbon dioxide ($CO_2$) sampling line enables quick detection of misplacement of the catheter within a patient's trachea.

Accordingly, the present invention is directed to a feeding tube apparatus comprising (a) a catheter suitable for use with a removable stylet, the catheter comprising a catheter proximal end, a catheter distal end opposite the catheter proximal end, a catheter channel extending along a length of the catheter from the catheter proximal end towards the catheter distal end, and an inflatable balloon component positioned along the catheter proximate the catheter distal end, and one or more of: (1) a carbon dioxide ($CO_2$) sampling line, (2) a suction tube component, (3) a pH sensor, and (4) an electromagnetic sensor. The feeding tube apparatus may further comprise the removable stylet, and the removable stylet may comprise one or more of: (1) a pH sensor, and (2) an electromagnetic sensor.

In some embodiments, the feeding tube apparatus of the present comprising (a) a catheter suitable for use with a removable stylet, the catheter comprising a catheter proximal end, a catheter distal end opposite the catheter proximal end, a catheter channel extending along a length of the catheter from the catheter proximal end towards the catheter distal end, and an inflatable balloon component positioned along the catheter proximate the catheter distal end, and (b) a carbon dioxide ($CO_2$) sampling line that is connectable to the catheter. The feeding tube apparatus may further comprise the removable stylet. In addition, as discussed herein, the removable stylet may further comprise one or more components including, but not limited to, a pH sensor, typically positioned at a distal end of the stylet; an electromagnetic sensor, typically positioned at the distal end of the stylet to detect a travel course of the feeding tube.

In another exemplary embodiment, the feeding tube apparatus of the present invention comprises (I) a catheter suitable for use with a removable stylet, the catheter comprising a catheter proximal end, a catheter distal end opposite the catheter proximal end, a catheter channel extending along a length of the catheter from the catheter proximal end towards the catheter distal end, and an inflatable balloon component positioned along the catheter proximate the catheter distal end; (II) a removable stylet comprising a stylet proximal end and a stylet distal end opposite the stylet proximal end, the stylet distal end being sized so as to be insertable within (i) a catheter opening at the catheter proximal end, and (ii) the catheter channel; and (III) a carbon dioxide ($CO_2$) sampling line that is connectable to the catheter, wherein the carbon dioxide ($CO_2$) sampling line (a) comprises a sampling line proximal end, a sampling line distal end opposite the sampling line proximal end, a sampling line channel extending along a length $L_{SL}$ of the carbon dioxide ($CO_2$) sampling line from the sampling line proximal end towards the sampling line distal end, and (b) enables detection of misplacement of the catheter within a patient's trachea.

In another exemplary embodiment, the feeding tube apparatus of the present comprising (a) a catheter suitable for use with a removable stylet, the catheter comprising a catheter proximal end, a catheter distal end opposite the catheter proximal end, a catheter channel extending along a length of the catheter from the catheter proximal end towards the catheter distal end, and an inflatable balloon component positioned along the catheter proximate the catheter distal end, and (b) a suction tube component as described herein. The feeding tube apparatus may further comprise one or more of: (1) a pH sensor, (2) an electromagnetic sensor, (3) the herein-described carbon dioxide ($CO_2$) sampling line, and (4) the removable stylet, wherein the removable stylet may further comprise one or more of: (1) a pH sensor, and (2) an electromagnetic sensor.

In another exemplary embodiment, the feeding tube apparatus of the present comprising (a) a catheter suitable for use with a removable stylet, the catheter comprising a catheter proximal end, a catheter distal end opposite the catheter proximal end, a catheter channel extending along a length of the catheter from the catheter proximal end towards the catheter distal end, and an inflatable balloon component positioned along the catheter proximate the catheter distal end, and (b) a pH sensor as described herein. The feeding tube apparatus may further comprise one or more of: (1) an electromagnetic sensor, (2) the carbon dioxide ($CO_2$) sampling line, (3) a suction tube component as described herein, and (4) the removable stylet, wherein the removable stylet may further comprise one or more of: (1) a pH sensor, and (2) an electromagnetic sensor.

In yet another exemplary embodiment, the feeding tube apparatus of the present comprising (a) a catheter suitable for use with a removable stylet, the catheter comprising a catheter proximal end, a catheter distal end opposite the catheter proximal end, a catheter channel extending along a length of the catheter from the catheter proximal end towards the catheter distal end, and an inflatable balloon component positioned along the catheter proximate the catheter distal end, and (b) an electromagnetic sensor as described herein. The feeding tube apparatus may further comprise one or more of: (1) the carbon dioxide ($CO_2$) sampling line, (2) a suction tube component as described herein, (3) a pH sensor, and (4) the removable stylet, wherein the removable stylet may further comprise one or more of: (1) a pH sensor, and (2) an electromagnetic sensor.

The present invention is further directed to methods of using the disclosed feeding tube apparatus. In one exemplary embodiment, the method of using the disclosed feeding tube apparatus of the present invention comprises a method for intubating a patient so as to introduce one or more nutrients into the duodenum of the patient, wherein the method comprises: inserting a distal tip of a catheter of the feeding tube apparatus into a patient's nostril until approximately a twenty five centimeter (25 cm) depth mark in an average adult size patient, approximately, middle of the esophagus area; inflating an inflatable balloon positioned proximate a distal end of the catheter; and observing a carbon dioxide ($CO_2$) sampling line connected to a conventional $CO_2$ monitor commonly available in hospitals. Observation of absence of $CO_2$ variability with breathing indicates placement of the feeding tube in the esophagus and the feeding tube can be safely advanced into the stomach. Observation of the presence of $CO_2$ waves with breathing, indicates misplacement of the feeding tube in the trachea, and requires the feeding tube to be partially withdrawn to a level just above the patient's vocal cords and then reinserted into the esophagus.

The early detection of trachea misplacement before the feeding tube with stylet is advanced further, prevents serious complication of perforating the lung and causing potentially fatal complication known as pneumothorax. Inflating the inflatable balloon positioned proximate the distal end of the catheter facilitates occlusion of the trachea or occlusion of the esophagus.

Therefore, exhaled air from the lungs is channeled through the feeding tube lumen providing accurate and reliable sample, or on the other hand, when the feeding tube balloon is inflated in the middle of the esophagus, air from the lung cannot enter the distal end of the feeding tube, that is distal to the inflated balloon in the esophagus. In addition to observing $CO_2$ waves with breathing if the feeding tube is in the trachea, or absence of $CO_2$ waves with breathing if the feeding tube is in the esophagus, the user is instructed to watch for a drop in pulse oximetry if the feeding tube balloon is inflated in the trachea.

The present invention is even further directed to kits that may be used in methods of providing nutrients to a patient. In one exemplary embodiment, the kit of the present invention comprises one of the disclosed feeding tube apparatus in combination with one or more additional kit components. Suitable additional kit components include, but are not limited to, a carbon dioxide ($CO_2$) sampling line, a syringe, a spring guide wire, a plunger, or any combination thereof.

These and other features and advantages of the present invention will become apparent after a review of the following detailed description of the disclosed embodiments and the appended claims.

BRIEF DESCRIPTION OF THE DRAWINGS

The present invention is further described with reference to the appended figures, wherein.

DETAILED DESCRIPTION OF THE INVENTION

The present invention is directed to feeding tube apparatus comprising (a) a feeding tube comprising an inflatable balloon component in combination with (b) a carbon dioxide ($CO_2$) sampling line and/or (c) a suction tube component that extends along a portion of an outer surface of the feeding tube. The present invention is further directed to methods of using a feeding tube apparatus comprising a feeding tube in combination with a carbon dioxide ($CO_2$) sampling line and/or a suction tube component that extends along a portion of an outer surface of the feeding tube. The present invention is even further directed to kits that may be used in methods of providing nutrients to a patient.

The feeding tube apparatus of the present invention may comprise a number of components. A description of individual components and combinations of individual components is provided below.

I. Feeding Tube Apparatus Components

Figure 1A:
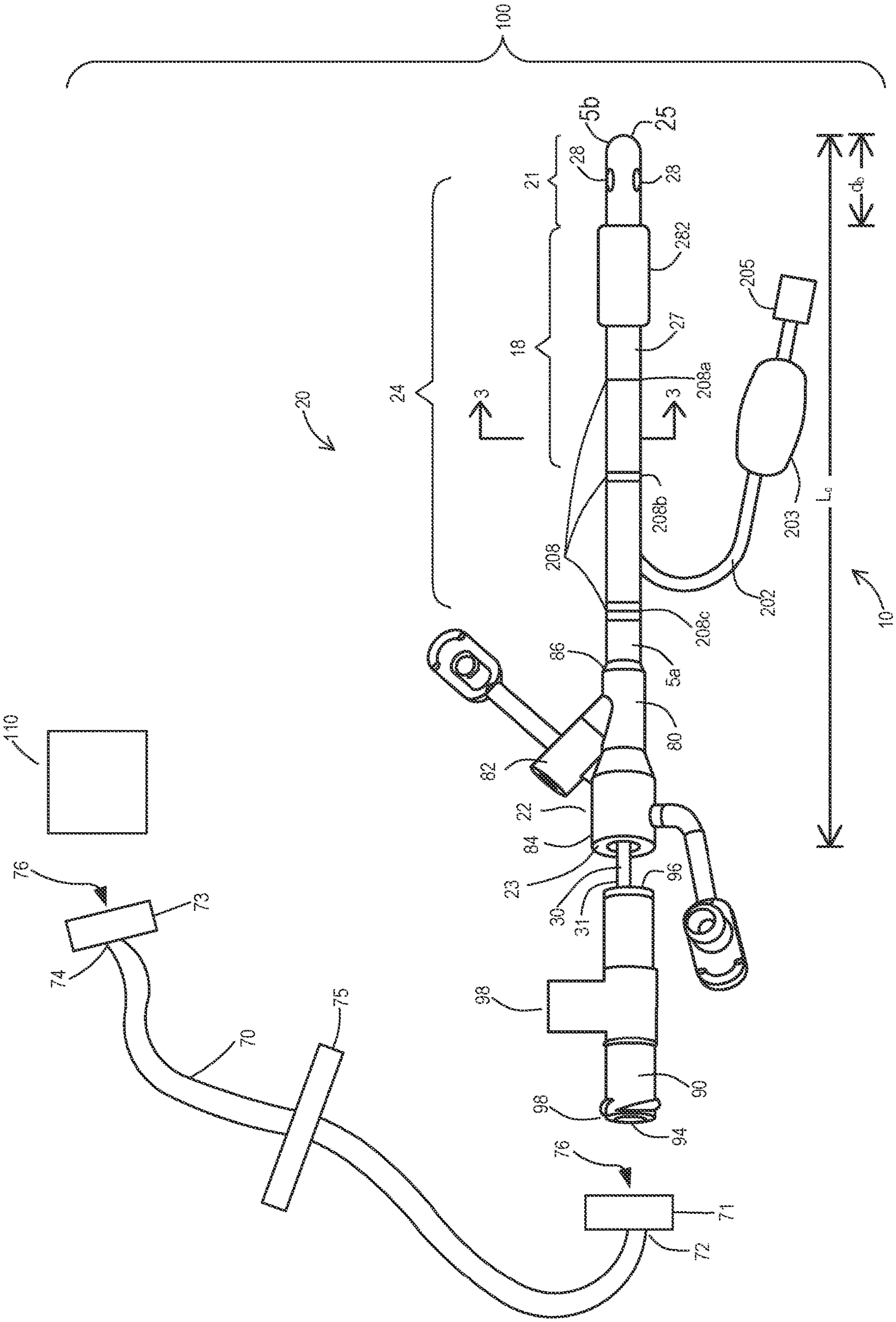
FIG. 1A depicts an exemplary feeding tube apparatus of the present invention with an exemplary inflatable balloon component in a non-inflated state.
Figure 1B:
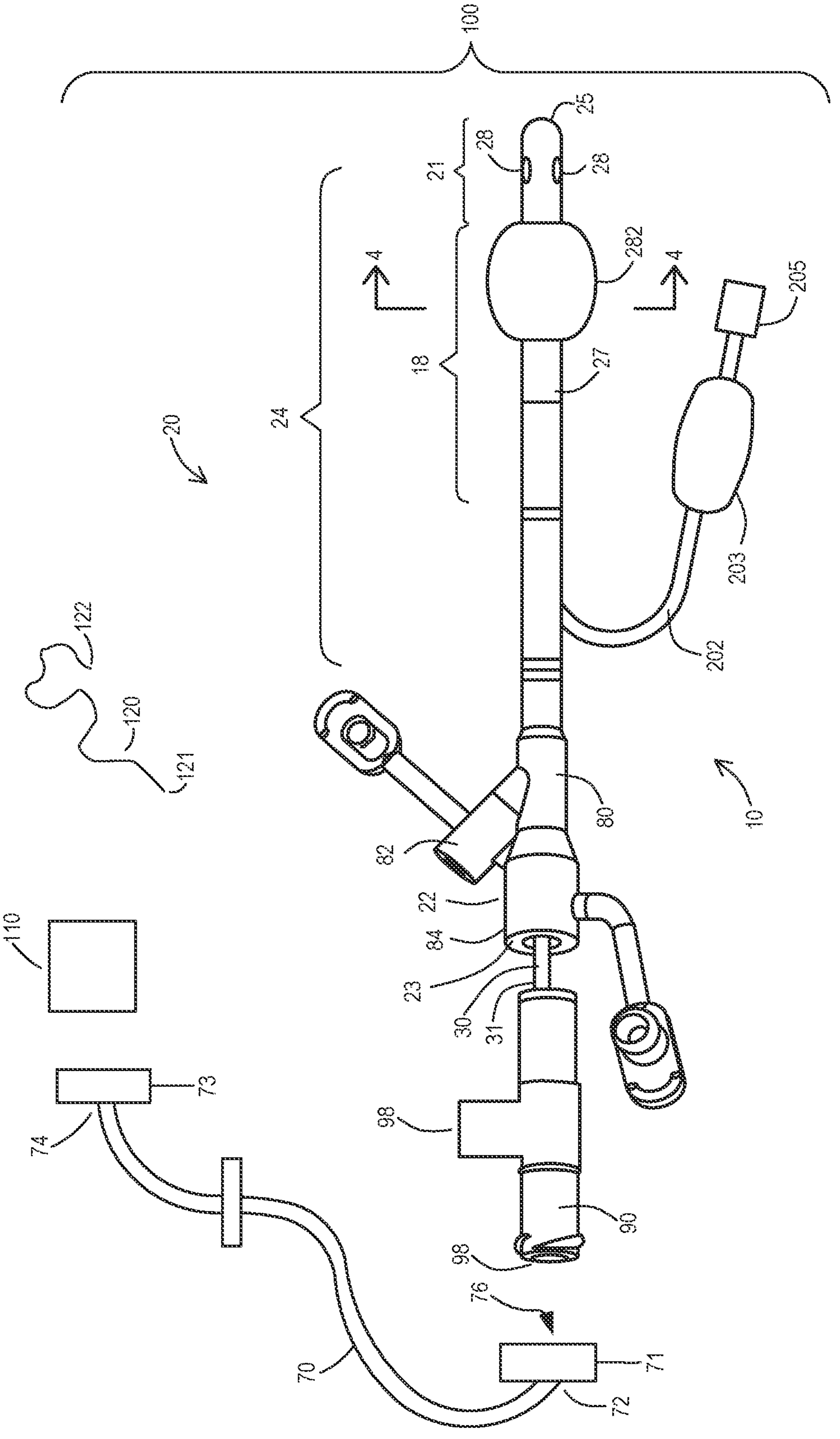
FIG. 1B depicts the exemplary feeding tube apparatus shown in FIG. 1A with the exemplary inflatable balloon component in an inflated state.

FIG. 1A depicts an exemplary feeding tube apparatus 10 of the present invention with an exemplary inflatable balloon component 282 in a non-inflated state, and an exemplary carbon dioxide ($CO_2$) sampling line 70 in an unconnected state. FIG. 1B depicts exemplary feeding tube apparatus 10 shown in FIG. 1A with exemplary inflatable balloon component 282 in an inflated state, and exemplary carbon dioxide ($CO_2$) sampling line 70 in an unconnected state.

As shown in FIGS. 1A-1B, feeding tube apparatus of the present invention may comprise one or more of the following components.

A. Catheter

Feeding tube apparatus of the present invention, such as exemplary feeding tube apparatus 10 shown in FIGS. 1A-1B, comprise a catheter 20. Catheter 20 comprises a tube with a proximal end 22 and a distal end 24. Distal tip 25 of distal end 24 may be closed as shown in FIGS. 1A-1B, or may form an open lumen 266 as shown in FIG. 2B. Open lumen 266 allows for the delivery of food from distal tip 25 of catheter 20. Alternatively, distal tip 25 of catheter 20 is closed (as shown in FIG. 1A) and does not contain an open lumen 266. In this alternative embodiment, catheter 20 may contain one or more side holes 28 for food/nutrient delivery to a patient 480.

Figure 2A:
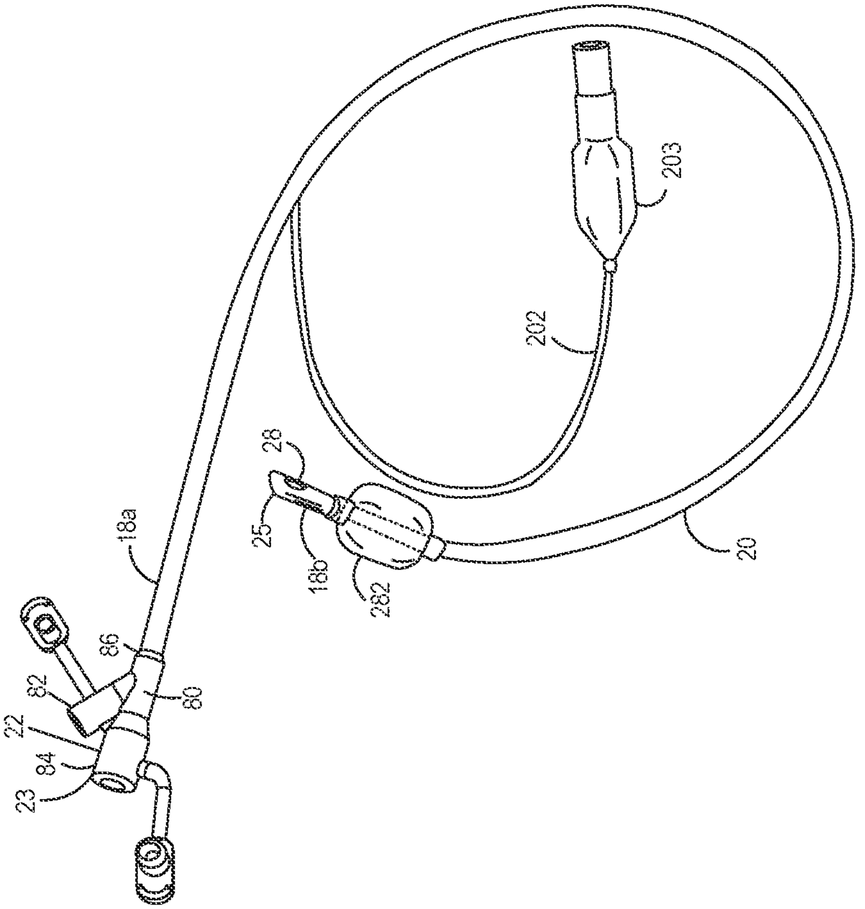
FIG. 2A depicts another exemplary feeding tube apparatus of the present invention with an exemplary inflatable balloon component in an inflated state.
Figure 2B:
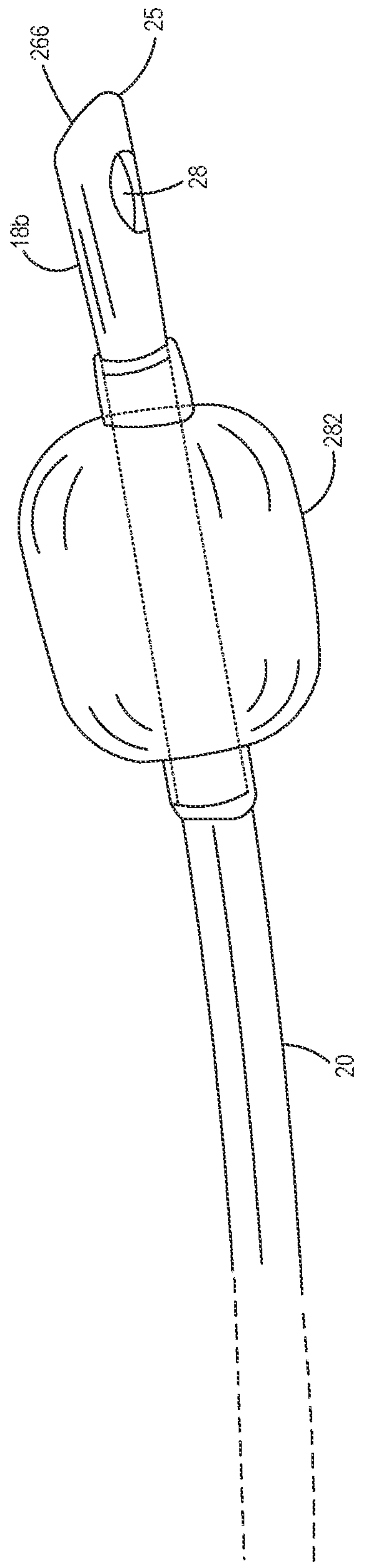
FIG. 2B depicts a close-up view of the distal end of the exemplary feeding tube apparatus shown in FIG. 2A.

As shown in FIGS. 2A-2B, even when distal tip 25 of distal end 24 forms an open lumen 266, catheter 20 may comprise one or more side holes 28 for food/nutrient delivery to a patient 480 and/or aspiration of fluid from the stomach (e.g., sampling by aspiration using a syringe to test acidity or alkalinity using pH paper) through the one or more side holes 28. As shown in FIGS. 2A-2B, exemplary catheter 20 comprises an open lumen 266 at distal end 24, and a single side hole 28.

Distal tip 25 and the region 21 proximal to distal tip 25 may be formed of a softer material than the material that forms the rest of the catheter 20. This allows distal tip 25 and region 21 proximal to distal tip 25 to be atraumatic and allows magnetic material(s) 32 to have a more pronounced effect on maneuverability and guidance than they would if a stiffer material were used. Proximal end 22 of catheter 20 also forms an opening 23 into which removable stylet 30 is placed when inserted into catheter 20.

Catheter 20 may be formed of any suitable tubing material. Suitable tubing materials include, but are not limited to, the tubing materials disclosed in U.S. Pat. No. 9,713,578, the subject matter of which is incorporated herein in its entirety.

In one exemplary embodiment, catheter 20 is constructed in whole or in part of a medical grade radio-opaque material. Suitable medical grade radio-opaque materials include, but are not limited to, polyurethane, polyvinyl chloride (PVC) or silicon tubing. In some embodiments, the tubing comprises a polyurethane for strength. Examples of suitable polyurethanes include, but are not limited to, those available under the trade designations ESTANE® (Lubrizol Advanced Materials, Inc.), PEBAX® (Arkema France Corp.), PELLETHANE® (Dow Chemical Co.), and CARBOTHANE® (Lubrizol Advanced Materials, Inc.).

Typically, the medical grade radio-opaque material has a durometer ranging from about 60 A to about 100 D on the durometer shore hardness scale, but the medical grade radio-opaque material may have any durometer typically used in tubing materials such as feeding tubes. In some embodiments, the medical grade radio-opaque material has a durometer ranging from about 70 A to about 90 D on the durometer shore hardness scale.

Figure 3:
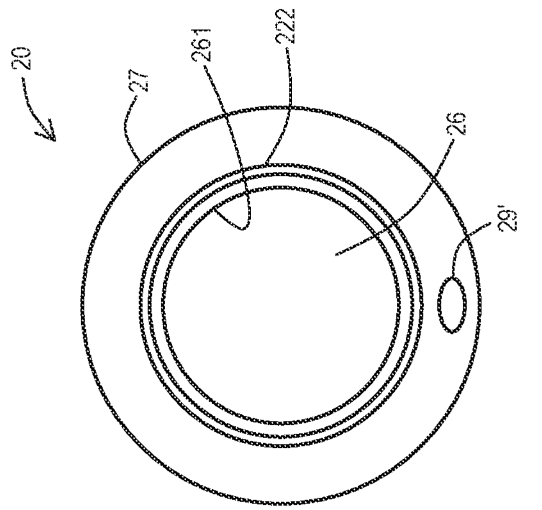
FIG. 3 depicts a cross-sectional view of the exemplary feeding tube apparatus shown in FIG. 1A along line 3-3 shown in FIG. 1A.
Figure 4:
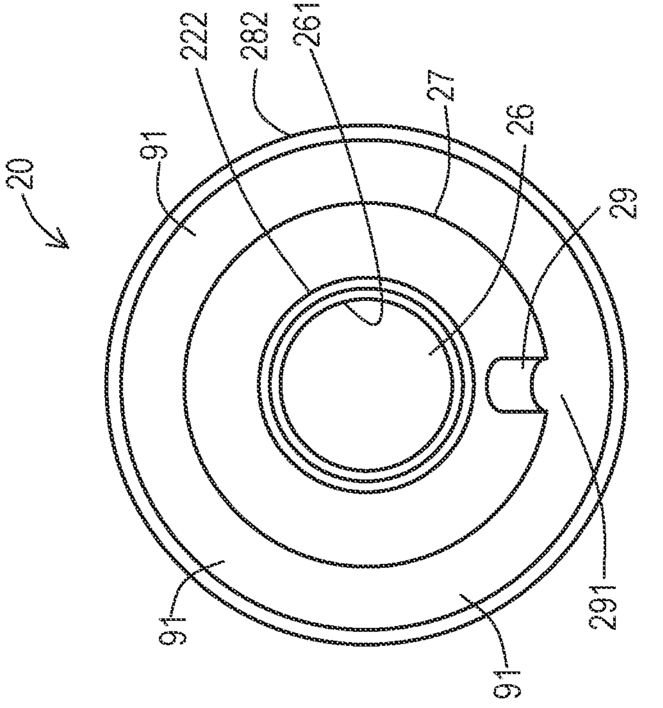
FIG. 4 depicts a cross-sectional view of the exemplary feeding tube apparatus shown in FIG. 1B along line 4-4 shown in FIG. 1B.
Figure 5:
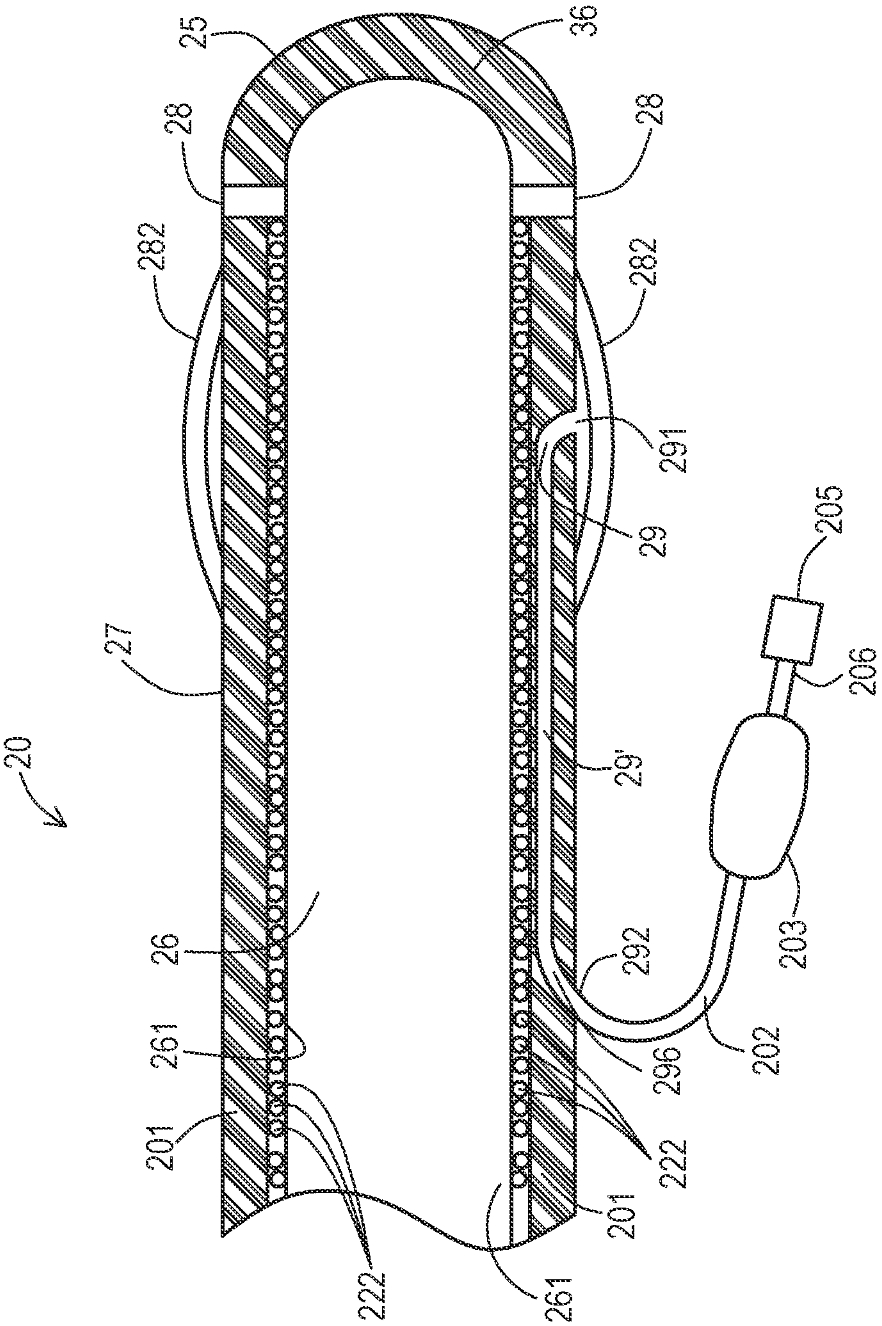
FIG. 5 depicts a cross-sectional view of a portion of the exemplary catheter within the exemplary feeding tube apparatus shown in FIG. 1A from point 5*a* to point 5*b* shown in FIG. 1A.

In some embodiments, the walls of the catheter may contain a reinforcing material 222 e.g., as shown in FIGS. 3-5. In these embodiments, the walls 201 of catheter 20 may contain, for example, an MRI compatible reinforcing material 222, such as a fiber, monofilament, or non-ferrous metal. This allows the catheter 20 to have a thin wall, while maintaining the desired inner diameter. Reinforcing material 222 also provides kinking and/or crush-resistance to catheter 20 even when the catheter 20 is conforming to a tortuous path in the patient's body. Reinforcing material 222 also allows catheter 20 to be especially resilient to perforation, thereby facilitating the use of a plunger (not shown) to purge a clogged catheter 20 without the risk of perforating or damaging the feeding tube 10.

When present, reinforcing material 222 may be present as a coil reinforcing material 222 (e.g., a metal coil 222) as shown in FIGS. 3-5. Coil reinforcing material 222 may extend a complete length $L_c$ of catheter 20, or less than the complete length $L_c$. For example, in some embodiments, coil reinforcing material 222 extends the complete length $L_c$ of catheter 20 except for about one centimeter on either end of catheter 20. See, for example, FIG. 2A, wherein a metal coil reinforcing material (i.e., embedded within wall 201 or along an inner surface 261 of wall 201) extends from point 18*a* to point 18*b* along catheter 20. In other embodiments, coil reinforcing material 222 extends from about point 5*a* to one or more side holes 28 of catheter 20. In other embodiments, coil reinforcing material 222 extends from about point 5*a* to distal tip 25 of catheter 20.

In some embodiments, coil reinforcing material 222 is embedded within wall 201 of catheter 20 as shown in FIGS. 3-5. However, in other embodiments (not shown), coil reinforcing material 222 extends along inner surface 261 of wall 201 of catheter 20 so as to form an inner surface (i.e., that comes into contact with removable stylet 30). When coil reinforcing material 222 lines an inner surface of catheter 20, the contact surface of coil reinforcing material 222 (i.e., the surface that comes into contact with removable stylet 30) may further comprise a coating (not shown) that minimizes friction between catheter 20 and removable stylet 30.

Any standard diameter and length of tubing material may be used to form the catheter 20. Standard catheter sizes are referred to as "French" sizes, e.g. size F4 refers to a tube with a 0.053 inch outer diameter, F5 refers to a tube with a 0.066 inch outer diameter, F6 refers to a tube with a 0.079 inch outer diameter, F7 refers to a tube with a 0.092 inch outer diameter, F8 refers to a tube with a 0.104 inch outer diameter, F10 refers to a tube with a 0.131 inch outer diameter, F11 refers to a tube with a 0.143 inch outer diameter, and F12 refers to a tube with a 0.156 inch outer diameter. In one exemplary embodiment, the tubing is a single lumen 2603-80AE PELLETHANE® F11 or F12 tube. The F11 tube has an outer diameter of 0.143 inches and an inner diameter of 0.111 inches; and the F12 tube has an outer diameter of 0.156 inches and an inner diameter of 0.116 inches. However other size tubing is suitable as well. In place of single lumen tubing, double lumen tubing or alternative styles may be used as described below. The inner diameter of the tubing (i.e., the diameter of the lumen) should be sufficiently large to allow the fluids and nutrients to pass through catheter 20 without clogging catheter 20. Typically, the inner diameter of the tubing (i.e., the diameter of the lumen) is sufficiently large to allow commercially available nutrition formulas to pass through the tubing.

The length of catheter 20 determines how deep into the gut the feeding tube 10 can be placed for the delivery of fluids and nutrients. Typical lengths for catheter 20 range from about 80 cm to about 150 cm. More typically, catheter 20 is at least 125 cm long. In one exemplary embodiment, catheter 20 is 127 cm long. This allows for nutrients to be delivered deep into the bowel and thereby prevent reflux.

In addition to openings 23 and 266 at proximal and distal ends 22 and 24 of catheter 20, catheter 20 may further comprise one or more side holes 28 along and within wall 201 of catheter 20. In some embodiments, side holes 28 are located as close to distal tip 25 as possible without compromising the strength of the tubing and interfering with magnetic material(s) 32 and optional reed switch assembly 60. In one embodiment, side holes 28 are located in region 18 between the proximal end 22 and inflatable balloon component 282. In another embodiment, side holes 28 are located within region 21 proximate to distal tip 25 of catheter 20.

B. Inflatable Balloon Component

Feeding tube apparatus of the present invention, such as exemplary feeding tube apparatus 10 shown in FIGS. 1A-1B, further comprise an inflatable balloon component, such as inflatable balloon component 282. Inflatable balloon component 282 comprises an inflatable material that may be pliable or non-pliable. Suitable materials for forming inflatable balloon component 282 include, but are not limited to, polyvinyl chloride (PVC), silicon, latex, medical grade rubber, nitrile, and ChronoPrene™ material.

Inflatable balloon component 282 is positioned along an outer surface 27 of catheter 20, typically proximate distal end tip 25. Inflatable balloon component 282 may be attached to outer surface 27 of catheter 20 via any known method of attaching one material to another. A description of known methods may be found in U.S. Pat. No. 9,713,578, the subject matter of all of which is hereby incorporated by reference.

Inflatable balloon component 282 may be inflated via at least one inflation tube 202 and an inflating device (e.g., a syringe 288 as shown in FIG. 9F) as shown in FIG. 1A. Each inflation tube 202 may connect with an inflation channel 29' extending along a length $L_c$ of catheter 20 and within a sidewall 201 of catheter 20. Each inflating channel 29' comprising an inflating channel inlet opening 292 proximate catheter proximal end 22 and an inflating channel outlet opening 291 along an outer surface 27 of catheter 20 positioned underneath inflatable balloon component 282. FIG. 3 depicts a cross-sectional view of exemplary feeding tube apparatus shown in FIG. 1A along line 3-3 shown in FIG. 1A so as to illustrate an exemplary inflation channel 29'.

FIG. 4 depicts a cross-sectional view of exemplary feeding tube apparatus 10 shown in FIG. 1B along line 4-4 shown in FIG. 1B. As shown in FIG. 4, inflating channel outlet opening 291 is positioned along outer surface 27 of catheter 20 underneath inflatable balloon component 282.

FIG. 5 depicts a cross-sectional view of a portion of exemplary catheter 20 within exemplary feeding tube apparatus 10 shown in FIG. 1A from point 5*a* to point 5*b* shown in FIG. 1A. As shown in FIG. 5, inflating channel 29' comprising an inflating channel inlet opening 292 proximate catheter proximal end 22 and an inflating channel outlet opening 291 along an outer surface 27 of catheter 20 positioned underneath inflatable balloon component 282.

Each inflation tube 202 may be attached to catheter 20 via any known method of attaching one material to another. A description of known methods may be found in U.S. Pat. No. 9,713,578, the subject matter of all of which is hereby incorporated by reference.

C. Removable Stylet

Feeding tube apparatus of the present invention, such as exemplary feeding tube apparatus 10 shown in FIGS. 1A-1B, may further comprise a removable stylet, such as removable stylet 30. Removable stylet 30 comprises a proximal end 31 and a distal end 34, with distal end 34 terminating in a distal tip 35. As shown in FIGS. 1A-1B, removable stylet 30 further comprises stylet hub 90, a stylet hub port 98 for attachment of a carbon dioxide ($CO_2$) sampling line 70.

In one exemplary embodiment, removable stylet 30 is long enough to extend along the length of catheter 20, but not beyond distal tip 25 of catheter 20. In another exemplary embodiment, removable stylet 30 is long enough to extend along the length of catheter 20 and beyond open lumen 266 at distal tip 25 of catheter 20, which allows catheter 20 to track over a removable stylet 30 already in place in the desired location. Thus, removable stylet 30 can guide catheter 20 to its desired location, by passing catheter 20 over removable stylet 30 until it reaches the desired placement location.

Typical lengths for removable stylet 30 range from about 127 cm, which generally corresponds with the length of catheter 20, to a length greater than the length of catheter 20, such as about 175 cm, which allows for removable stylet 30 to extend beyond distal tip 25 of catheter 20. In one preferred embodiment, removable stylet 30 is about 127 cm long.

The outer diameter of removable stylet 30 is selected based on the inner diameter of catheter 20. The outer diameter of removable stylet 30 is less than the inner diameter of catheter 20 so that removable stylet 30 can easily slide into and out of catheter 20, as desired. By way of example, for catheters 20 formed using 11 FR or 12 FR tubing, removable stylet 30 may have an outer diameter from 0.030 to 0.107 inches.

The proximal end 84 of feeding tube hub 80 attaches to the distal end 96 of stylet hub 90. Stylet hub 90 contains an opening at each end (i.e., proximal end 94 and distal end 96) and is hollow throughout the length of stylet hub 90. Removable stylet 30 exits stylet hub 90 at distal end 96 of stylet hub 90 and extends inside and along the length $L_c$ of catheter 20. Stylet hub 90 also contains a port 98 for connection to a carbon dioxide ($CO_2$) sampling line 70.

A description of other possible features (e.g., materials, components, etc.) of removable stylet 30 may be found in U.S. Pat. No. 9,713,578, the subject matter of all of which is hereby incorporated by reference; however, it should be understood that other known removable stylets may also be used in the present invention.

D. Carbon Dioxide Sampling Line

Feeding tube apparatus 10 of the present invention may further comprise a carbon dioxide ($CO_2$) sampling line 70, which provides early detection of misplacement of feeding tube apparatus 10 in the trachea 481, typically, within 5 seconds (i.e., one breath only). Prior to the present invention, a drop of pulse oximeter reading (i.e., a drop in oxygen saturation in the blood) was used to detect a misplaced feeding tube balloon, which could take one or more minutes.

In the feeding tube apparatus 10 of the present invention, balloon 282, when inflated in an esophagus area 485 of the patient 480, nearly occludes the esophagus 485 or trachea 481 such that exhaled air from the lung must exit through feeding tube apparatus 10 not around it as in other prior feeding tubes. Also, when feeding tube apparatus 10 is in the correct location, and the esophagus 485 is occluded by balloon 282, exhaled air cannot travel from the trachea 481 into the esophagus 485 around the inflated balloon 282, so the exhaled air exits through the feeding tube lumen 266. A carbon dioxide monitor 110 will show a flat line with respiration when feeding tube apparatus 10 is in the esophagus 485. However, if the feeding tube apparatus 10 is misplaced within the trachea 481, the carbon dioxide monitor 110 will detect carbon dioxide, and trigger a user to withdraw the feeding tube 10 and retry intubation.

E. Suction Tube Component

Feeding tube apparatus 10 of the present invention may further comprise a suction tube component extending concurrently over a portion of catheter 20. An exemplary feeding tube apparatus 10 showing this optional feature is shown in FIGS. 8A-8B.

Figure 8A:
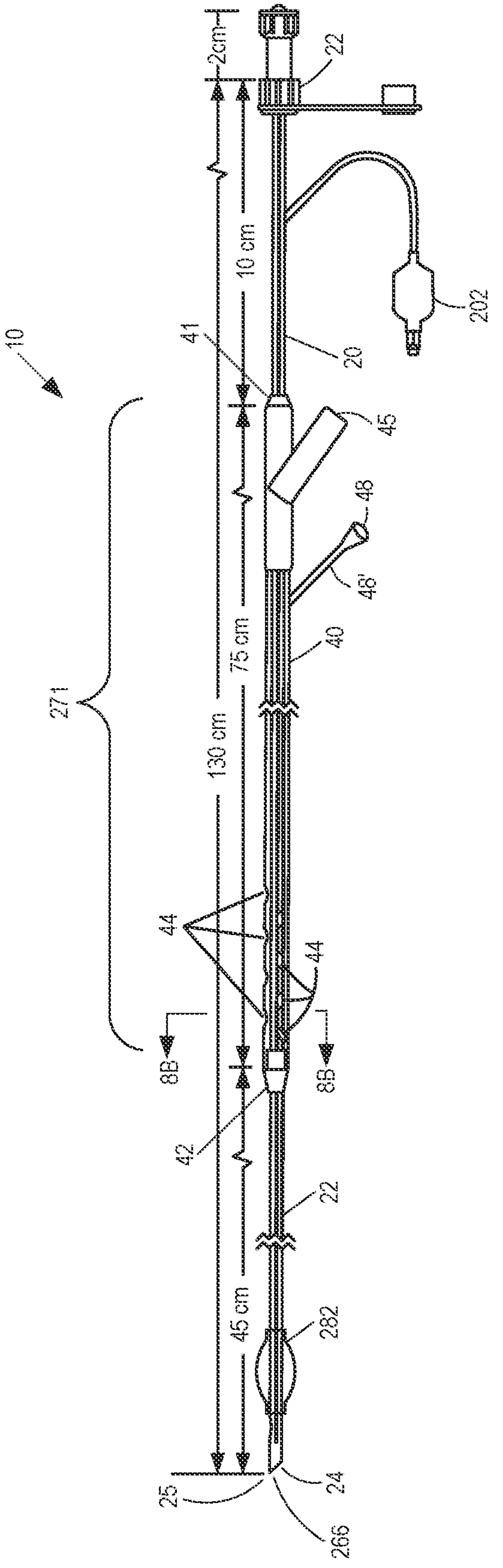
FIGS. 8A-8C provide views of another exemplary feeding tube apparatus of the present invention with a gastric suction port.

As shown in FIG. 8A, exemplary feeding tube apparatus 10 comprises catheter 20 with proximal end 22, distal end 24, distal tip 25, open lumen 266, and inflatable balloon component 282 along outer surface 27 of catheter 20. Exemplary feeding tube apparatus 10 also comprises a suction tube component 40 extending along a portion 271 of outer surface 27 of catheter 20. Exemplary suction tube component 40 comprises a suction tube proximate end 41, a suction tube distal end 42, and a lumen 43 external to feeding tube shaft 20 extending between suction tube proximate end 41 and suction tube distal end 42. See, for example, the cross-sectional view of exemplary feeding tube apparatus 10 shown in FIG. 8B as viewed along line 8B-8B shown in FIG. 8A. Exemplary suction tube component 40 further comprises one or more openings (i.e., suction holes) 44 positioned proximate suction tube distal end 42, and at least one port 45 at suction tube proximate end 41.

Figure 8B:
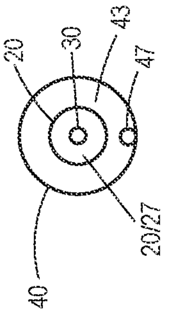
Figure 8C:
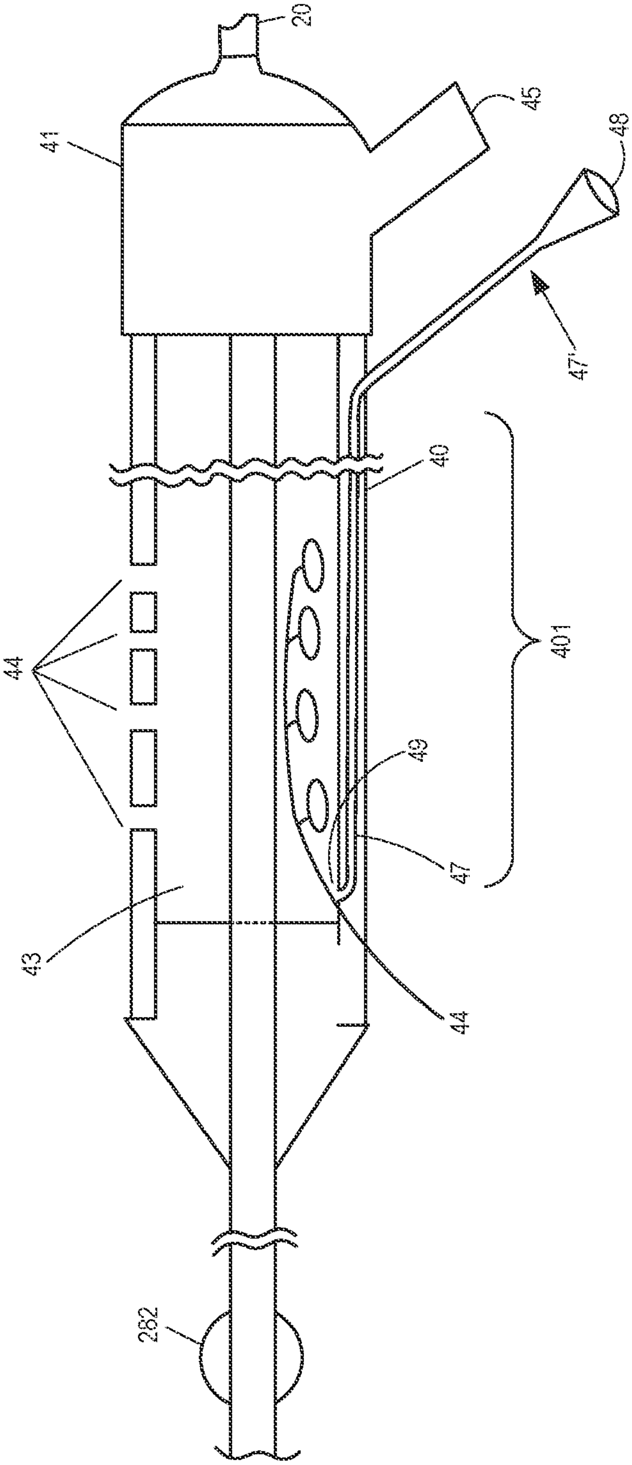

As shown in FIGS. 8B and 8C, exemplary suction tube component 40 further comprises vent channel 47 extending from vent opening 49 within lumen 43, thru and along a wall portion 401 of exemplary suction tube component 40 to vent tube 47' and ending at vent tube inlet 48.

Vent channel 47 and vent tube inlet 48 ensure that, even if suction tube component 40 is lodged against a wall in a patient's body, aspirating catheter 40 will not create a suction situation and potentially damage internal tissues or stomach walls. See, for example, FIGS. 8B-8C. Vent channel 47 connects the inside cavity/lumen 43 of the suction tube component 40 to air outside of exemplary suction tube component 40.

In one exemplary embodiment, feeding tube apparatus 10 has an overall length of about 132 cm, catheter 20 of feeding tube apparatus 10 has an overall length of about 130 cm, removable stylet 30 of feeding tube apparatus 10 has an overall length of less than or about 130 cm, and suction tube component 40 of feeding tube apparatus 10 (i) has an overall length of about 75 cm and (ii) is positioned about 45 cm from distal tip 25 of catheter 20 and about 10 cm from proximate end 22 of catheter 20.

Suction tube component 40 may be formed from materials such as those described above for catheter 20.

Suction tube component 40 typically has an outer diameter of from about 5.0 millimeters (mm) to about 10.0 mm, for example, 7.5 mm.

F. Optional Components

Feeding tube apparatus 10 of the present invention may further comprise a spring guide wire that is not attached to the stylet (not shown in figures). The spring wire guide may be a J-wire or a straight spring guide wire. In this embodiment, after removable stylet 30 is removed from catheter 20, the spring guide wire can be placed in catheter 20 until it protrudes from opening 266 at distal end 25 of catheter 20. Then, the spring guide wire can be used to facilitate guidance of catheter 20 as it advances through the intestinal tract. In other embodiments, stylet 30 has a stylet length $L_s$ of about 175 cm to achieve same function as the J wire.

Optionally, distal end 34 of removable stylet 30 or catheter distal end 24 of catheter 20 may further comprise a pH sensor probe 36 connected to a digital pH meter (not shown) at stylet proximal end 31 or catheter proximal end 22. This allows one to measure the pH of the surrounding environment around distal end 34 of removable stylet 30 or catheter distal end 24 as feeding tube apparatus 10 is maneuvered through the patient 480 to help determine when feeding tube apparatus 10 reaches the desired location for placement. In one exemplary embodiment, a pH sensor 36 is mounted on the outer wall (i.e., sidewall 201) of catheter 20 for continuous or intermittent monitoring of pH. See, for example, FIG. 5. In one exemplary embodiment, a pH sensor 36 is mounted on the outer wall 38 of removable stylet 30 for continuous or intermittent monitoring of pH. See, for example, FIG. 6.

Distal end 34 of removable stylet 30 may further comprise an electromagnetic sensor 37 at the distal end 34 of removable stylet 30 to detect the travel course of the removable stylet 30 (and the catheter 20. An electromagnetic detector (not shown) positioned outside of the patient 480 can detect the position of electromagnetic sensor 37 as distal end 34 of removable stylet 30 is maneuvered through the patient 480 to help determine when removable stylet 30 reaches the desired location for placement. In one exemplary embodiment, an electromagnetic sensor 37 is mounted on or within outer wall 38 of removable stylet 30. Typically, when present, electromagnetic sensor 37 is positioned at a position/location along distal end 34 of removable stylet 30, more typically, positioned proximate a tip 39 of removable stylet 30. See, for example, FIG. 6.

II. Kits Comprising a Feeding Tube Apparatus

The present invention is also directed to kits that may be used in methods of providing nutrients to a patient 480 while detecting misplacement of the catheter 20 within a patient's trachea 481. The kits of the present invention comprise one or more of the feeding tube apparatus 10 described above. Other additional kit components suitable for use with the feeding tube apparatus 10 described above are disclosed in U.S. Pat. No. 9,713,578, the subject matter of all of which is hereby incorporated by reference.

Kits of the present invention may further include one or more additional components that assist the medical practitioner in use of feeding tube apparatus 10. Suitable additional components include, but are not limited to, a syringe 288, preferably a 60 CC syringe; one or more towels; one or more cups; disposable gloves; numbing gel (e.g., 2% Xylocaine gel); tape; gauze; spring guide wire; and/or pH paper. Kits may also comprise a spring guide wire that can be inserted into catheter 20 after removable stylet 30 is removed.

III. Methods of Using Feeding Tube Apparatus

The present invention is further directed to methods of using the disclosed feeding tube apparatus 10 comprising (1) a feeding tube 10 with an inflatable balloon component 282, and (2) at least one of: (a) a carbon dioxide ($CO_2$) sampling line 70, (b) a suction tube component 40 that extends along a portion of an outer surface of the feeding tube catheter 20, (c) a pH sensor 36, and (d) an electromagnetic sensor 37.

In one exemplary embodiment, the method of using the disclosed feeding tube apparatus 10 comprises a method for intubating a patient 480 (see, FIGS. 9A-9D) so as to introduce one or more nutrients or medication into the duodenum of the patient, wherein the method comprises: inserting the distal tip 25 of the catheter 20 of the feeding tube apparatus 10 into a patient's nostril; and in response to the carbon dioxide ($CO_2$) sampling line 70 of the feeding tube apparatus 10 detecting misplacement of the catheter 20 within a patient's trachea 481, at least partially removing the catheter 20 from the patient's nostril.

Methods of using the disclosed feeding tube apparatus 10 of the present invention may also comprise a method for intubating a patient 480 so as to introduce one or more nutrients into the duodenum of the patient 480, wherein the method comprises: inserting a distal tip 25 of a catheter 20 of the feeding tube apparatus 10 into a patient's nostril 350 until the distal tip 25 is positioned in a mid-esophagus region 486 of a patient 480; inflating an inflatable balloon component 282 of the catheter 20; monitoring carbon dioxide exiting the catheter 20 thru a carbon dioxide ($CO_2$) sampling line 70 of the feeding tube apparatus 10; and in response to detected carbon dioxide, indicating misplacement of the catheter 20 within a patient's trachea 481, deflating the inflatable balloon component 282 of the catheter 20, and at least partially removing the catheter 20 from the patient's nostril 350.

The distal tip 25 of catheter 20 is introduced into the naris 350 of the patient's nose and advanced by the continued application of a compressive force to catheter 20 forcing distal tip 25 to the back portion of the patient's head (nasopharynx 483) and into the esophagus 485. As is common, the passageway of the esophagus 485 affords ample guidance to distal tip 25 whereupon it enters the body portion of the stomach 380. A description of the advancement of a feeding tube, such as exemplary feeding tube 10 disclosed herein, may be found in U.S. Pat. No. 9,713,578, the subject matter of all of which is hereby incorporated by reference.

After catheter 20 is placed in the desired location within the patient's stomach (not shown), removable stylet 30 is removed. Catheter 20 can remain in place when the patient 480 undergoes diagnostic tests, such as MRI imaging when removable stylet 10 is removed.

When suction tube component 40 is present, the methods of using the disclosed feeding tube apparatus 10 comprising an inflatable balloon component 282 may further comprise one or more of the following steps: to remove fluids, gastric juice, air, food debris/items from the patient's stomach, to decompress the stomach, to remove gastric contents to prevent gastroesophageal reflux into the lung especially in unconscious, sedated, critically ill and burn patients. A suction line (not shown) may be connected to port 45 at suction tube proximate end 41 to remove fluid from the patient's stomach, into and through one or more openings 44, through lumen 43, and out of port 45.

Other Embodiments

Feeding Tube Apparatus:

1. A feeding tube apparatus 10 comprising a catheter 20 suitable for use with a removable stylet 30, said catheter 20 comprising a catheter proximal end 22, a catheter distal end 24 opposite said catheter proximal end 22, a catheter channel 26 extending along a length $L_c$ of said catheter 20 from said catheter proximal end 22 towards said catheter distal end 24, and an inflatable balloon component 282 positioned along said catheter 20 proximate said catheter distal end 24, said feeding tube apparatus 10 further comprising at least one of:
   (1) a carbon dioxide ($CO_2$) sampling line 70 that is connectable to the catheter 20, said carbon dioxide ($CO_2$) sampling line 70 (a) comprising a sampling line distal end 72, a sampling line proximal end 74 opposite said sampling line distal end 72, a sampling line channel 76 extending along a length $L_{SL}$ of said carbon dioxide ($CO_2$) sampling line 70 from said sampling line distal end 72 towards said sampling line proximal end 74, and (b) enabling detection of misplacement of the catheter 20 within a patient's trachea 481;
   (2) a suction tube component 40 extending along a portion 271 of an outer surface 27 of catheter 20, said suction tube component 40 comprising a suction tube proximate end 41, a suction tube distal end 42, and a suction tube lumen 43 extending (i) between said suction tube proximate end 41 and said suction tube distal end 42, and (ii) along and external to said outer surface 27 of catheter 20;
   (3) a pH sensor 36 positioned along at least one of: (i) the catheter 20, and (ii) a removable stylet 30 suitable for use with the catheter 20; and
   (4) an electromagnetic sensor 37 positioned along at least one of: (i) the catheter 20, and (ii) a removable stylet 30 suitable for use with the catheter 20.
2. The feeding tube apparatus 10 of embodiment 1, wherein said catheter distal end 24 comprises a catheter distal end tip 25, and said catheter distal end tip 25 is open (e.g., as shown in FIGS. 2A-2B). Note, in other embodiments, the catheter distal end tip 25 may be closed (e.g., as shown in FIGS. 1A-1B).

3. The feeding tube apparatus 10 of embodiment 1 or 2, wherein said inflatable balloon component 282 is positioned a distance $d_b$ from a catheter distal end tip 25 of said catheter 20.
4. The feeding tube apparatus 10 of any one of embodiments 1 to 3, wherein said inflatable balloon component 282 is positioned a distance $d_b$ of from about 0.0 centimeters (cm) to about 10.0 cm from a catheter distal end tip 25 of said catheter 20 (or any other distance $d_b$ from the catheter distal end tip 25 of said catheter 20 to about 10 cm, in increments of 0.1 cm, or any range of distances $d_b$ between 0.0 cm and about 10 cm, in increments of 0.1 cm, e.g., from about 0.1 to about 2.0 cm, with 1.5 cm being a preferred distance $d_b$ in some embodiments).
5. The feeding tube apparatus 10 of any one of embodiments 1 to 4, wherein said inflatable balloon component 282 extends along an outer surface 27 of said catheter 20. Inflatable balloon component 282 may be attached to outer surface 27 of catheter 20 via any known attaching member (not shown). Suitable attaching members include, but are not limited to, an adhesive, and a mechanical bond (e.g., an ultrasonic welding bond).
6. The feeding tube apparatus 10 of any one of embodiments 1 to 5, wherein said inflatable balloon component 282 is sized so as to contain up to 10.0 milliliters (ml) of inflating fluid 91 (see, FIG. 4) (or any amount up to 10 ml, or any range between greater than 0 ml to about 10 ml, in increments of 0.1 ml, with about 3.0 ml being preferred for adult patients, and about 1.0 ml being preferred for smaller, pediatric patient).
7. The feeding tube apparatus 10 of any one of embodiments 1 to 6, wherein said inflatable balloon component 282 is sized so as to contain from about 1.0 ml to about 5.0 ml of inflating fluid 91.
8. The feeding tube apparatus 10 of any one of embodiments 1 to 7, wherein said inflatable balloon component 282 contains from about 1.0 ml to about 5.0 ml of inflating fluid 91.
9. The feeding tube apparatus 10 of embodiment 8, wherein said inflating fluid 91 comprises water. It should be noted that, in other embodiments, the inflating fluid 91 may comprise another type of fluid, such as air.
10. The feeding tube apparatus 10 of any one of embodiments 1 to 9, wherein said catheter 20 further comprises one or more inflating holes 29 with each inflating hole 29 having an inflating hole outlet 291 along an outer surface 27 of said catheter 20 positioned underneath said inflatable balloon component 282. Typically, the catheters 20 of the present invention comprise a single inflating hole 29.
11. The feeding tube apparatus 10 of any one of embodiments 1 to 9, wherein said catheter 20 further comprises one inflating channel 29' extending along a length $L_c$ of said catheter 20 and within a sidewall 201 of said catheter 20, said one inflating channel 29' comprising an inflating channel inlet opening 292 proximate said catheter proximal end 22 and an inflating channel outlet opening 291 along an outer surface 27 of said catheter 20 positioned underneath said inflatable balloon component 282. Typically, the catheters 20 of the present invention comprise a single inflating channel 29'.
12. The feeding tube apparatus 10 of any one of embodiments 1 to 11, wherein said catheter 20 further comprises one or more inflation tubes 202 attached to said catheter 20 along an outer surface 27 of said catheter 20 proximate said catheter proximal end 22. Typically, the one or more inflation tubes 202 are attached to the catheter 20 along an outer surface 27 of said catheter 20 as shown in FIG. 5. Each inflation tube 202 may be attached to catheter 20 along outer surface 27 via any known attaching member (not shown). Suitable attaching members include, but are not limited to, an adhesive, and a mechanical bond (e.g., an ultrasonic welding bond). Typically, the catheters 20 of the present invention comprise a single inflation tube 202, even though the catheters 20 of the present invention may comprise more than one inflation tube 202.
13. The feeding tube apparatus 10 of embodiment 12, further comprising a pilot balloon 203 positioned along and in fluid communication with said single inflation tube 202, pilot balloon 203 being positioned so as to indicate whether said inflatable balloon component 282 is inflated or deflated.
14. The feeding tube apparatus 10 of embodiment 12 or 13, further comprising one or more inflating devices 288 operatively adapted to provide inflating fluid 91 through said one or more inflation tubes 202 and into said inflatable balloon component 282. Typically, the catheters 20 of the present invention comprise a single inflating device 288, even though the catheters 20 of the present invention may comprise more than one inflating device 288.
15. The feeding tube apparatus 10 of embodiment 14, wherein said one or more inflating devices 288 comprise a syringe 288 (see, FIG. 9F). (The syringe 288 may be connected to inflation tube 202 at port/valve 205 as shown in FIG. 5 so as to input water or another fluid into inflation tube 202.)
16. The feeding tube apparatus 10 of any one of embodiments 1 to 15, wherein said catheter 20 further comprises one or more magnetically inert, MRI compatible valves 205 that temporarily prevent inflating fluid 91 from exiting said inflatable balloon component 282 once inflated. Typically, the catheters 20 of the present invention comprise a single valve 205 for the catheter 20 or a single valve 205 for each inflation tube 202. Each valve 205 may comprise a spring loaded, auto shut off valve that allows fluid flow into and out of inflatable balloon component 282 only when depressed by an inflating device 288 such as syringe 288).
17. The feeding tube apparatus 10 of any one of embodiments 1 to 16, wherein said catheter 20 further comprises one or more visual markers 208 extending along an outer surface 27 of said catheter 20, each of said one or more visual markers 208 providing a visual indication of a catheter length extending from a catheter distal end tip 25 to a given visual marker 208. In other words, the visual markers provide a visual reference that indicates a position (i.e., depth) of the catheter distal end tip 25 of the feeding tube 10 within a patient.
18. The feeding tube apparatus 10 of any one of embodiments 1 to 17, wherein said catheter 20 further comprises two or more sets of one or more visual markers 208 (e.g., sets 208*a*, 208*b* and 208*c* shown in FIG. 1A) extending along an outer surface 27 of said catheter 20, each of said one or more visual markers 208 providing a visual indication of a catheter length extending from a catheter distal end tip 25 to a given visual marker.

Figure 6:
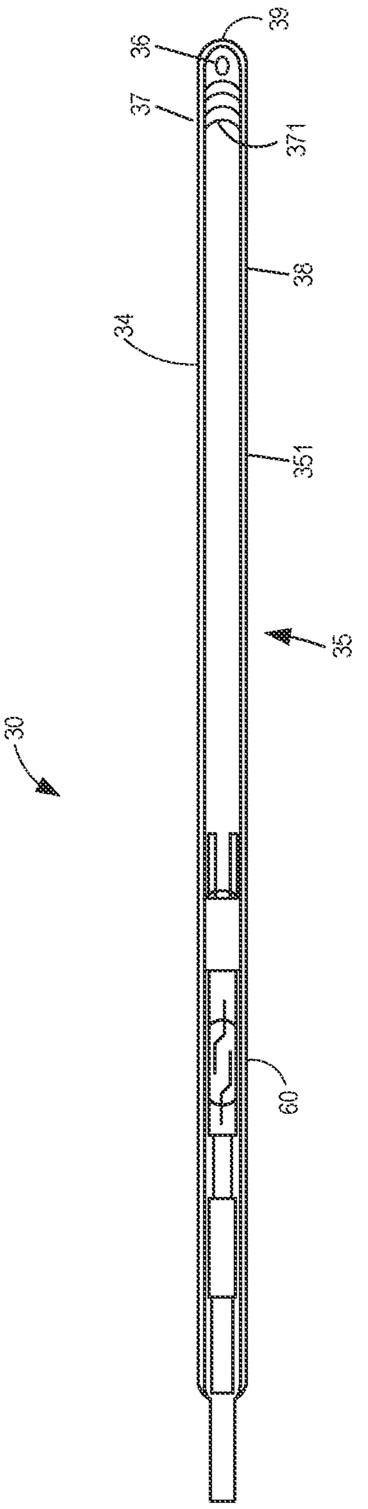
FIG. 6 depicts a view of a distal end portion of the exemplary stylet shown in the exemplary feeding tube apparatus of FIGS. 1A-1B.
Figure 7:
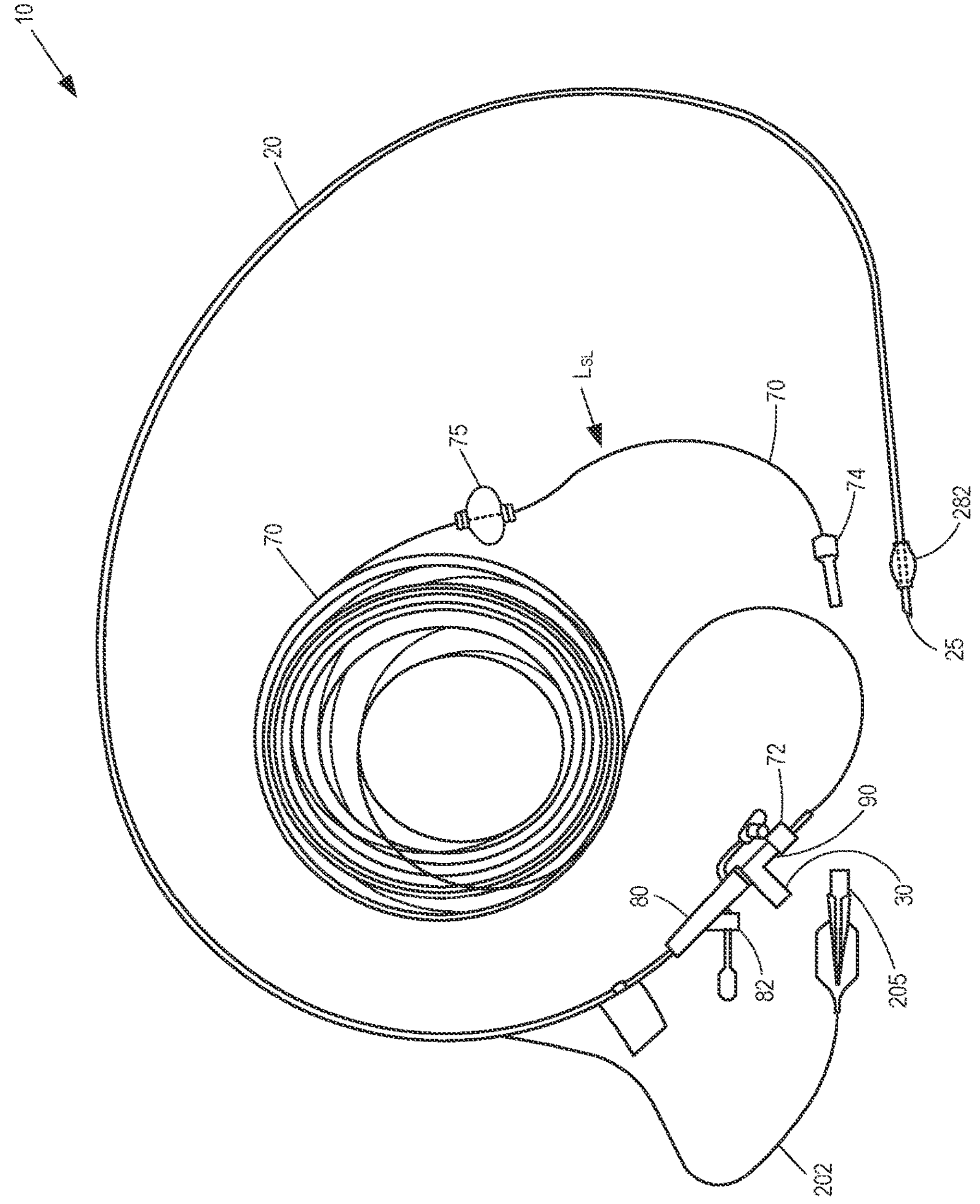
FIG. 7 provides a photograph of an exemplary feeding tube apparatus of the present invention.

19. The feeding tube apparatus 10 of embodiment 18, wherein said two or more sets of one or more visual markers 208 comprise (i) a single visual marker 208*a* at a distance of about 50 cm from a catheter distal end tip 25, (ii) two adjacent visual markers 208*b* at a distance of about 80 cm from said catheter distal end tip 25, and (iii) three adjacent visual markers 208*c* at a distance of about 110 cm from said catheter distal end tip 25. For example, the 50 cm mark 208*a* may correspond to a lower end of the patient's esophagus, the 80 cm mark 208*b* may correspond to the first part of the patient's duodenum, and the 110 cm mark 208*c* may correspond to the catheter distal tip 25 being within the $4^{th}$ part of the patient's duodenum in an adult size patient.
20. The feeding tube apparatus 10 of any one of embodiments 1 to 19, wherein said catheter 20 further comprises one or more side holes 28, wherein each side hole 28 (1) extends from an inner surface 261 of said catheter 20 along said catheter channel 26 to an outer surface 27 of said catheter 20, and (2) is positioned (i) between said inflatable balloon component 282 and a catheter distal end tip 25, (ii) between said inflatable balloon component 282 and said catheter proximal end 22, or (iii) both (i) and (ii). Typically, the catheters 20 of the present invention comprise two or more side holes 28, more typically, from about 1 to about 4 side holes 28. See, for example, side holes 28 shown in FIGS. 1A-2B.
21. The feeding tube apparatus 10 of embodiment 20, wherein at least one of said side holes 28 is positioned between said inflatable balloon component 282 and a catheter distal end tip 25.
22. The feeding tube apparatus 20 of any one of embodiments 1 to 21, wherein said catheter 20 further comprises a feeding tube hub 80 positioned at said catheter proximal end 22, said feeding tube hub 80 comprising one or more hub ports 82 to allow for aspiration or delivery of medications via said catheter 20.
23. The feeding tube apparatus 10 of any one of embodiments 1 to 22, wherein said catheter 20 further comprises a feeding tube hub 80 positioned at said catheter proximal end 22, said feeding tube hub 80 comprising two or more hub ports 82 to allow for aspiration or delivery of medications via said catheter 20. Typically, the catheters 20 of the present invention comprise two to three hub ports 82.
24. The feeding tube apparatus 10 of any one of embodiments 1 to 23, wherein a wall 201 of said catheter 20 (see, FIG. 5) extending along a length $L_c$ of said catheter 20 comprises an MRI compatible reinforcing material 222. In some embodiments, the MM compatible reinforcing material 222 comprising a coil reinforcing material 222 extending along a length $L_c$ of said catheter 20 and within or along an inner portion of said wall 201 with individual coils of said coil reinforcing material 222 extending substantially perpendicular to length $L_c$ of catheter 20 (see, FIGS. 3-5).
25. The feeding tube apparatus 10 of any one of embodiments 1 to 24, wherein a wall 201 of said catheter 20 extending along a length $L_c$ of said catheter 20 comprises medical grade radio-opaque material. Suitable medical grade radio-opaque materials include, but are not limited to, polyvinyl chloride (PVC), and polyurethane loaded with from about 20% weight to about 40% weight barium sulfate or bismuth subsalicylate.
26. The feeding tube apparatus 10 of any one of embodiments 1 to 25, wherein said catheter 20 further comprises said pH sensor 36 positioned along the catheter distal end 24. See, for example, FIG. 5. pH sensor 36 may be positioned along any portion of catheter 20, but is typically positioned along an outer surface 27 of catheter 20 proximate the catheter distal end 24.
27. The feeding tube apparatus 10 of any one of embodiments 1 to 26, wherein said pH sensor 36 is positioned along an outer surface 27 of said catheter 20.
28. The feeding tube apparatus 10 of any one of embodiments 1 to 27, wherein said pH sensor 36 is positioned (i) between said inflatable balloon component 282 and said catheter distal end tip 25, (ii) between said inflatable balloon component 282 and said catheter proximal end 22, or (iii) both (i) and (ii).
29. The feeding tube apparatus 10 of any one of embodiments 1 to 28, further comprising a removable stylet 30, said removable stylet 30 comprising a stylet proximal end 31 and a stylet distal end 34 opposite said stylet proximal end 31, said stylet distal end 34 being sized so as to be insertable within (i) a catheter opening 23 at said catheter proximal end 22, and (ii) said catheter channel 26.
30. The feeding tube apparatus 10 of embodiment 29, wherein said removable stylet 30 comprises a stylet hub 90 at said stylet proximal end 31, said stylet hub 90 comprising a stylet hub proximal end 94, a stylet hub distal end 96, and a stylet channel that allows air flow through said stylet hub 90 and between open lumen 266 of catheter 20 and lumen 76 of a $CO_2$ sampling line 70, said stylet hub distal end 96 being connectable to the proximal end 84 of feeding tube hub 80. See, stylet proximal end 31 in FIGS. 1A-1B, and a stylet distal end 35 in FIG. 6.
31. The feeding tube apparatus 10 of embodiment 30, wherein said stylet hub 90 comprises a port 98 for connection to a carbon dioxide ($CO_2$) sampling line 70.
32. The feeding tube apparatus 10 of embodiment 31, wherein said port 98 comprises one or more port connectors 99 that enable connection of said stylet hub 90 to a carbon dioxide ($CO_2$) sampling line 70.
33. The feeding tube apparatus 10 of any one of embodiments 29 to 32, wherein said removable stylet 30 further comprises one or more magnetic materials (not shown) proximate said stylet distal end 34. Suitable magnet configurations are disclosed, for example, in U.S. Pat. No. 6,126,647, the subject matter of which is hereby incorporated herein in its entirety.
34. The feeding tube apparatus 10 of any one of embodiments 29 to 33, wherein said removable stylet 30 further comprises a reed switch assembly 60. A suitable reed switch assembly 60 is shown in FIG. 6. Other suitable reed switch assemblies 60 are disclosed in U.S. Pat. No. 6,126,647, the subject matter of which is hereby incorporated herein in its entirety.
35. The feeding tube apparatus 10 of any one of embodiments 29 to 34, wherein said removable stylet 30 is formed from a dual durometer material. Suitable dual durometer materials include, but are not limited to, nylon, polyether ether ketone (PEEK), and ESTANE® polymers (The Lubrizol Corporation).
36. The feeding tube apparatus 10 of any one of embodiments 29 to 35, wherein said removable stylet 30 further comprises said pH sensor 36 positioned along the stylet distal end 34. See, for example, FIG. 6. pH sensor 36 may be positioned along any portion of removable stylet 30, but is typically positioned along an outer surface 351 of removable stylet 30 proximate tip 39 of the stylet 30.

37. The feeding tube apparatus 10 of any one of embodiments 29 to 36, wherein said pH sensor 36 is positioned along an outer surface 351 of said removable stylet 30.

38. The feeding tube apparatus 10 of any one of embodiments 29 to 37, wherein said pH sensor 36 is positioned proximate tip 39 of removable stylet 30. See again, FIG. 6.

39. The feeding tube apparatus 10 of any one of embodiments 29 to 38, wherein said removable stylet 30 further comprises said electromagnetic sensor 37 positioned along the stylet distal end 34. See, for example, FIG. 6.

40. The feeding tube apparatus 10 of embodiment 39, wherein said electromagnetic sensor 37 is mounted on or within outer wall 38 of removable stylet 30. In some embodiments, electromagnetic sensor 37 comprises one or more loops of electromagnetic material 371 that can be electrically-driven to create a low-frequency magnetic field therein. An external electromagnetic meter (not shown) may be used to detect the low-frequency magnetic field of the electromagnetic sensor 37 and determine the exact location of the electromagnetic sensor 37 within the removable stylet 30.

41. The feeding tube apparatus 10 of embodiment 39 or 40, wherein said electromagnetic sensor 37 is positioned proximate tip 39 of removable stylet 30. See again, FIG. 6.

42. The feeding tube apparatus 10 of any one of embodiments 29 to 41, wherein said removable stylet 30 has an overall length $L_s$ equal to or greater than an overall length $L_c$ of said catheter 20.

43. The feeding tube apparatus 10 of any one of embodiments 29 to 42, wherein said removable stylet 30 has an overall length $L_s$ greater than an overall length $L_c$ of said catheter 20.

44. The feeding tube apparatus 10 of any one of embodiments 29 to 43, wherein said removable stylet 30 has an overall length $L_s$ that is greater than an overall length $L_c$ of said catheter 20 by about 40 cm. Typically, the catheter 20 has an overall length $L_c$ ranging from about 80 to about 150 cm, while the removable stylet 30 has an overall length $L_s$ ranging from about 78 to about 200 cm.

45. The feeding tube apparatus 10 of any one of embodiments 1 to 44, wherein said carbon dioxide ($CO_2$) sampling line 70 is present. As shown in FIG. 1A-1B, carbon dioxide ($CO_2$) sampling line 70 may further comprise a filter paper type valve 75 positioned along (e.g., at a middle position) of the $CO_2$ sampling line 70 that prevents liquid fluid from passing from the patient to a carbon dioxide ($CO_2$) monitor 110. The filter paper expands when exposed to fluid occluding the $CO_2$ sampling line 70 but will not expand and block the $CO_2$ sampling line 70 in response to air passing through the $CO_2$ sampling line 70.

46. The feeding tube apparatus 10 of any one of embodiments 1 to 45, wherein said carbon dioxide ($CO_2$) sampling line 70 is directly connectable to the catheter 20.

47. The feeding tube apparatus 10 of any one of embodiments 1 to 46, wherein said carbon dioxide ($CO_2$) sampling line 70 is indirectly connectable to the catheter 20.

48. The feeding tube apparatus 10 of any one of embodiments 1 to 45 and 47, wherein said carbon dioxide ($CO_2$) sampling line 70 is connectable to the removable stylet 30.

49. The feeding tube apparatus 10 of any one of embodiments 30 to 45 and 47 to 48, wherein said carbon dioxide ($CO_2$) sampling line 70 is connectable to said stylet hub 90 of the removable stylet 30.

50. The feeding tube apparatus 10 of any one of embodiments 30 to 45 and 47 to 49 wherein said carbon dioxide ($CO_2$) sampling line 70 is connectable to a port 98 positioned along said stylet hub 90 of the removable stylet 30.

51. The feeding tube apparatus 10 of any one of embodiments 1 to 50, wherein said carbon dioxide ($CO_2$) sampling line 70 further comprises a first carbon dioxide ($CO_2$) sampling line connector 71 that enables connection of said carbon dioxide ($CO_2$) sampling line 70 to the catheter 20 or the removable stylet 30 (e.g., a port 98 of stylet hub 90).

52. The feeding tube apparatus 10 of embodiment 51, wherein said first carbon dioxide ($CO_2$) sampling line connector 71 comprises a male Luer lock fitting or a female EnFit fitting.

53. The feeding tube apparatus 10 of embodiment 51 or 52, wherein said first carbon dioxide ($CO_2$) sampling line connector 71 is positioned at said sampling line distal end 72.

54. The feeding tube apparatus 10 of any one of embodiments 1 to 53, wherein said carbon dioxide ($CO_2$) sampling line 70 further comprises a second carbon dioxide ($CO_2$) sampling line connector 73 that enables connection of said carbon dioxide ($CO_2$) sampling line 70 to a carbon dioxide ($CO_2$) monitor 110.

55. The feeding tube apparatus 10 of embodiment 54, wherein said second carbon dioxide ($CO_2$) sampling line connector 73 comprises a fitting compatible with (i.e., connectable to) the CO2 monitor.

56. The feeding tube apparatus 10 of embodiment 54 or 55, wherein said second carbon dioxide ($CO_2$) sampling line connector 73 is positioned at said sampling line proximal end 74.

57. The feeding tube apparatus 10 of any one of embodiments 1 to 56, further comprising a carbon dioxide ($CO_2$) monitor 110, said sampling line 70 being connectable to said carbon dioxide ($CO_2$) monitor 110 so as to provide fluid flow between the catheter 20 and the carbon dioxide ($CO_2$) monitor 110. Suitable carbon dioxide ($CO_2$) monitors for use in the present invention include, but are not limited to, carbon dioxide ($CO_2$) monitors such as monitors made by Philips, Medtronic or Microstream (™).

58. The feeding tube apparatus 10 of any one of embodiments 1 to 57, wherein the carbon dioxide ($CO_2$) sampling line 70 enables detection of misplacement of the catheter 20 within a patient's trachea 481 in less than 45 seconds (sec.).

59. The feeding tube apparatus 10 of any one of embodiments 1 to 58, wherein the carbon dioxide ($CO_2$) sampling line 70 enables detection of misplacement of the catheter 20 within a patient's trachea 481 in less than 30 sec.

60. The feeding tube apparatus 10 of any one of embodiments 1 to 59, wherein the carbon dioxide ($CO_2$) sampling line 70 enables detection of misplacement of the catheter 20 within a patient's trachea 481 in less than 15 sec.

61. The feeding tube apparatus 10 of any one of embodiments 1 to 60, wherein the carbon dioxide ($CO_2$) sampling line 70 enables detection of misplacement of the catheter 20 within a patient's trachea 481 in less than 5 sec.

62. The feeding tube apparatus 10 of any one of embodiments 1 to 61, wherein the carbon dioxide ($CO_2$) sampling line 70 enables detection of misplacement of the catheter 20 within a patient's trachea 481 via a single breath of the patient 480.

63. The feeding tube apparatus 10 of any one of embodiments 1 to 62, wherein said suction tube component 40 is present.

64. The feeding tube apparatus 10 of any one of embodiments 1 to 63, wherein said suction tube component 40 further comprises (i) one or more openings 44 (also referred to herein as suction holes 44) positioned proximate said suction tube distal end 42, and a port 45 at said suction tube proximate end 41.

65. The feeding tube apparatus 10 of any one of embodiments 1 to 64, wherein said suction tube component 40 further comprises a vent channel 47 extending from a vent opening 49 within lumen 43, thru and along a wall portion 401 of said suction tube component 40 to a vent tube 47' and ending at a vent tube inlet 48. See, for example, exemplary vent channel 47. As discussed above, exemplary vent channel 47 (i) prevents suction against the stomach wall of a patient during use, and (ii) connects inside cavity/lumen 43 of the suction tube component 40 to air outside of exemplary suction tube component 40 (and feeding tube apparatus 10).

66. The feeding tube apparatus 10 of any one of embodiments 1 to 65, wherein said suction tube component 40 (i) has an overall length of about 75 cm, and (ii) is positioned about 45 cm from said distal tip 25 of said catheter 20 and about 10 cm from said proximate end 22 of said catheter 20.

67. The feeding tube apparatus 10 of any one of embodiments 1 to 66, wherein said suction tube component 40 is formed from materials such as those described above for catheter 20. Typically, suction tube component 40 is formed from a medical grade plastic material such as a polyvinyl chloride (PVC) or a polyurethane.

68. The feeding tube apparatus 10 of any one of embodiments 1 to 67, wherein said suction tube component 40 is formed from a medical grade plastic material comprising a PVC or a polyurethane.

69. The feeding tube apparatus 10 of any one of embodiments 1 to 68, wherein said suction tube component 40 has an outer diameter of from about 5.0 millimeters (mm) to about 10.0 mm, for example, 7.5 mm.

Kits Comprising a Feeding Tube Apparatus:

70. A kit 100 comprising the feeding tube apparatus 10 of any one of embodiments 1 to 69 in combination with one or more additional kit components.

71. The kit 100 of embodiment 70, wherein the kit 100 comprises the feeding tube apparatus 10, and the carbon dioxide ($CO_2$) sampling line 70.

72. The kit 100 of embodiment 70 or 71, wherein the kit 100 further comprises the suction tube component 40.

73. The kit 100 of any one of embodiments 70 to 72, wherein the kit 100 further comprises a length of thread 120 (e.g., silk thread) that can (i) be inserted through the one or more openings 28 within the catheter 20, and (ii) redirect the distal end 24 of catheter 20 by pulling on the length of thread 120.

74. The kit 100 of any one of embodiments 70 to 73, wherein the kit 100 further comprises a spring guide wire (not shown; see, for example, exemplary spring wire guides in FIGS. 10A-10C of U.S. Pat. No. 9,713,578, the subject matter of which is incorporated herein in its entirety), a syringe 288, pH paper (not shown), numbing gel (i.e., that can be applied to a patient's nostril)(not shown), one or more cotton-tipped swabs (not shown), lubricating gel (i.e., for providing a reduced coefficient of friction when inserting the feeding tube distal tip 25 into the nostril)(not shown), a pulse oximeter (not shown), an electromagnetic meter (not shown), or any combination thereof.

Methods of Using Feeding Devices:

75. A method for intubating a patient 480 (see, FIGS. 9A-9C) so as to introduce one or more nutrients into the duodenum 460 of the patient 480, said method comprising: inserting the distal tip 25 of the catheter 20 of the feeding tube apparatus 10 of any one of embodiments 1 to 69 into a patient's nostril; and in response to the carbon dioxide ($CO_2$) sampling line 70 of the feeding tube apparatus 10 detecting misplacement of the catheter 20 within a patient's trachea 481, at least partially retracting the catheter 20 from the patient's nostril to a level above the patient's vocal cords.

76. A method for detecting misplacement of a catheter 20 within a patient's trachea 481 (see, FIGS. 9A-9C), said method comprising: inserting the distal tip 25 of the catheter 20 of the feeding tube apparatus 10 of any one of embodiments 1 to 69 into a patient's nostril; and in response to the carbon dioxide ($CO_2$) sampling line 70 of the feeding tube apparatus 10 detecting misplacement of the catheter 20 within a patient's trachea 481, at least partially retracting the catheter 20 from the patient's nostril to a level above the patient's vocal cords.

77. A method for monitoring carbon dioxide ($CO_2$) output of a patient 480 (see, FIGS. 9A-9C), said method comprising: inserting the distal tip 25 of the catheter 20 of the feeding tube apparatus 10 of any one of embodiments 1 to 69 into a patient's nostril; and monitoring carbon dioxide ($CO_2$) exiting the carbon dioxide ($CO_2$) sampling line 70 of the feeding tube apparatus 10.

78. The method of any one of embodiments 75 to 77, further comprising directly connecting the carbon dioxide ($CO_2$) sampling line 70 to the flow-through stylet hub 90 of the removable stylet 30.

79. The method of any one of embodiments 75 to 78, further comprising directly connecting the carbon dioxide ($CO_2$) sampling line 70 to a port 98 positioned along the stylet hub 90 of the removable stylet 30.

80. The method of embodiment 79, further comprising capping any open port in fluid communication with the feeding tube lumen 266 (e.g., any open hub port 82 of catheter 20 and/or any open port 98 of stylet hub 90).

81. The method of any one of embodiments 75 to 80, further comprising connecting the carbon dioxide ($CO_2$) sampling line 70 to the carbon dioxide ($CO_2$) monitor 110.

82. The method of any one of embodiments 75 to 81, further comprising connecting the patient to a pulse oximeter (not shown). Sedated patients 480 who are unresponsive to trachea misplacement should be connected to a pulse oximeter and a $CO_2$ monitor 110 compatible with the provided $CO_2$ sampling line 70.

83. The method of any one of embodiments 75 to 82, wherein said inserting step comprises inserting the catheter 20 through a naris 350 of the patient 480; and when a distal end 24 of the catheter 20 is proximate a rear surface 482 of the nasopharynx 483, pulling on and/or holding in place a thread-like member 120 attached to a tube portion 28 of the distal end 24 of the catheter 20 so as to alter an initial direction A of the distal end 24 of the catheter 20 and point the distal end 24 of the catheter 20 towards a throat area 484 of the patient 480. This procedure for altering an initial direction A of the distal end of a feeding tube so as to point the distal end of the feeding tube towards the throat of the patient is disclosed in U.S. Pat. No. 10,881,588, which is assigned to the same assignee as the present case, namely, Syncro Medical Innovation, Inc., the subject matter of all of which is hereby incorporated by reference.
84. The method of embodiment 83, further comprising advancing the distal end 24 of the catheter 20 toward the throat area 484 of the patient 480 while pulling on or holding in place the thread-like member 120.
85. The method of embodiment 84, further comprising advancing the distal end 24 of the catheter 20 toward the throat area 484 of the patient 480 while holding in place the thread-like member 120.
86. The method of embodiment 85, further comprising disengaging the thread-like member 120 from the catheter 20; and further advancing the distal end 24 of the catheter 20 toward the throat area 484 of the patient 480 without the thread-like member 120.
87. The method of any one of embodiments 75 to 86, further comprising inflating inflatable balloon component 282 of the catheter 20 once the distal end 24 of the catheter 20 is about 30 centimeters (cm) within the patient 480 as measured via a 30 cm mark 208/244 on catheter 20. See, for example, FIG. 9C.
88. The method of embodiment 87, wherein said inflating step comprises using a syringe 288 (e.g., a provided Luer Lock syringe 288) to inflate the inflatable balloon component 282.
89. The method of embodiment 87 or 88, wherein said inflating step comprises inflating a pilot balloon 203 in fluid communication with the inflatable balloon component 282.
90. The method of any one of embodiments 87 to 89, wherein said inflating step comprises injecting about 6.0 cubic centimeters (cc) of air into the inflatable balloon component 282 and pilot balloon component 203.
91. The method of any one of embodiments 87 to 90, further comprising observing any end-tidal $CO_2$ wave and/or drop in pulse oximeter reading; and in response to detecting an end-tidal CO2 wave or a drop in pulse oximeter reading by about 5 or more points, indicating misplacement in the trachea, deflating the inflatable balloon component 282; and withdrawing the catheter 20 to an 18 cm mark 208/245 on catheter 20. See, for example, exemplary 18 cm mark 208/245 shown in FIG. 9B.
92. The method of embodiment 91, after said withdrawing step, re-inserting the distal tip 25 of the catheter 20 of the feeding tube apparatus 10 into the patient's nostril; and proceeding as discussed in any one of embodiments 67 to 81.
93. The method of any one of embodiments 75 to 92, wherein the carbon dioxide ($CO_2$) sampling line 70 enables detection of misplacement of the catheter 20 within a patient's trachea 481 in less than 45 seconds (sec.).
94. The method of any one of embodiments 75 to 93, wherein the carbon dioxide ($CO_2$) sampling line 70 enables detection of misplacement of the catheter 20 within a patient's trachea 481 in less than 30 sec.
95. The method of any one of embodiments 75 to 94, wherein the carbon dioxide ($CO_2$) sampling line 70 enables detection of misplacement of the catheter 20 within a patient's trachea 481 in less than 15 sec.
96. The method of any one of embodiments 75 to 95, wherein the carbon dioxide ($CO_2$) sampling line 70 enables detection of misplacement of the catheter 20 within a patient's trachea 481 in less than 5 sec.
97. The method of any one of embodiments 75 to 96, wherein the carbon dioxide ($CO_2$) sampling line 70 enables detection of misplacement of the catheter 20 within a patient's trachea 481 via a single breath of the patient 480.
98. The method of any one of embodiments 75 to 97, further comprising guiding the catheter 20 of the feeding tube apparatus 10 through the patient's stomach 380 until the inflatable balloon component 282 of the catheter 20 passes through the pyloric sphincter 450; and inflating the inflatable balloon component 282 of the catheter 20 so as to allow natural peristalsis of the patient 480 to further advance the feeding tube apparatus 10 comprising an inflated balloon component into the patient's duodenum 460/470. See, for example, FIG. 9D.
99. The method of embodiment 98, wherein said inflating step comprises inflating the inflatable balloon component 282 with water 91.
100. The method of embodiment 99, wherein said inflating step further comprises closing a valve 205 to prevent the water 91 from exiting the inflatable balloon component 282.
101. The method of embodiment 99 or 100, further comprising turning the patient on the patient's right side, allowing the feeding tube balloon 282 filled with water 91 to fall into/towards the pyloric sphincter 450 by gravity.
102. The method of any one of embodiments 98 to 101, wherein said guiding step comprises: introducing a distal tip 25 of the catheter 20 into the patient's nose 350; and pushing the catheter 20 through the patient's esophagus and into the patient's stomach 380.
103. The method of embodiment 102, wherein said guiding step further comprises: advancing the removable stylet 30 beyond the distal tip 25 of the catheter 20 into the patient's duodenum 470; and pushing the catheter 20 over the removable stylet 30 so as to advance the catheter 20.
104. The method of any one of embodiments 75 to 103, further comprising removing stomach fluid via suction through the suction tube component 40 of the feeding tube 10.
105. The method of any one of embodiments 75 to 104, further comprising checking a pH of an environment around the feeding tube 10.
106. The method of embodiment 105, wherein said checking step comprises checking the pH of the environment around the feeding tube 10 via a pH sensor 36 positioned along the distal end 24 of the catheter 20.

107. The method of embodiment 105, wherein said checking step comprises checking the pH of the environment around the feeding tube 10 via a pH sensor 36 positioned along the stylet distal end 34 of the removable stylet 30.

108. The method of any one of embodiments 75 to 107, further comprising determining a position of the stylet distal end 34 of the removable stylet 30 via an electromagnetic sensor 37 positioned at the stylet distal end 34 of the removable stylet 30.

109. The method of embodiment 108, wherein said determining step comprises using an external electromagnetic meter (not shown) to detect the position of the electromagnetic sensor 37 within the patient 480.

110. The method of any one of embodiments 75 to 109, wherein said method further comprises: removing the removable stylet 30 from the catheter 20.

111. The method of any one of embodiments 75 to 110, wherein said method further comprises: conducting an x-ray procedure so as to verify a position of the catheter 20 within the patient 480.

112. The method of any one of embodiments 75 to 111, wherein said method further comprises: delivering one or more nutrients to the patient 480 through one or more openings 28 within the catheter 20.

113. The method of any one of embodiments 75 to 112, further comprising removing the catheter 20 from the patient 480.

114. The method of any one of embodiments 75 to 113, further comprising removing the catheter 20 from the patient 480 after deflating the inflatable balloon component 282.

115. The method of any one of embodiments 75 to 114, further comprising advancing the catheter 20 from a mid-esophagus region to the stomach while the inflatable balloon component 282 is inflated. This prevents accidental advancing of the catheter 20 deeper into the patient's lung, puncturing the small distal bronchioles and causing pneumothorax.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Example 1

Preparation of Feeding Tube Apparatus

Exemplary feeding tube apparatus as shown in FIGS. 1A-8C were prepared using conventional steps (e.g., one or more thermoforming steps, and one or more connection/assembly steps).

Example 2

Method of Using Feeding Tube Apparatus

Figure 9A:
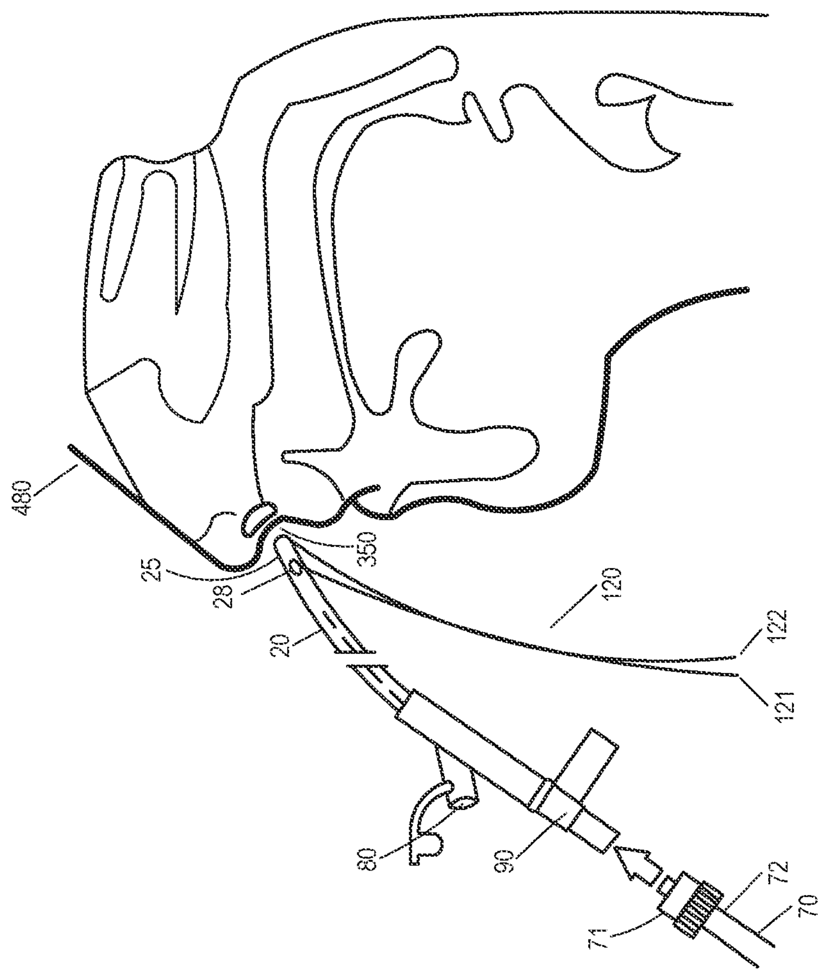
FIGS. 9A-9D depict an exemplary feeding tube apparatus of the present invention and progressive steps showing its use in a method of inserting a feeding tube through the nasopharynx and into the stomach of a patient.
Figure 9B:
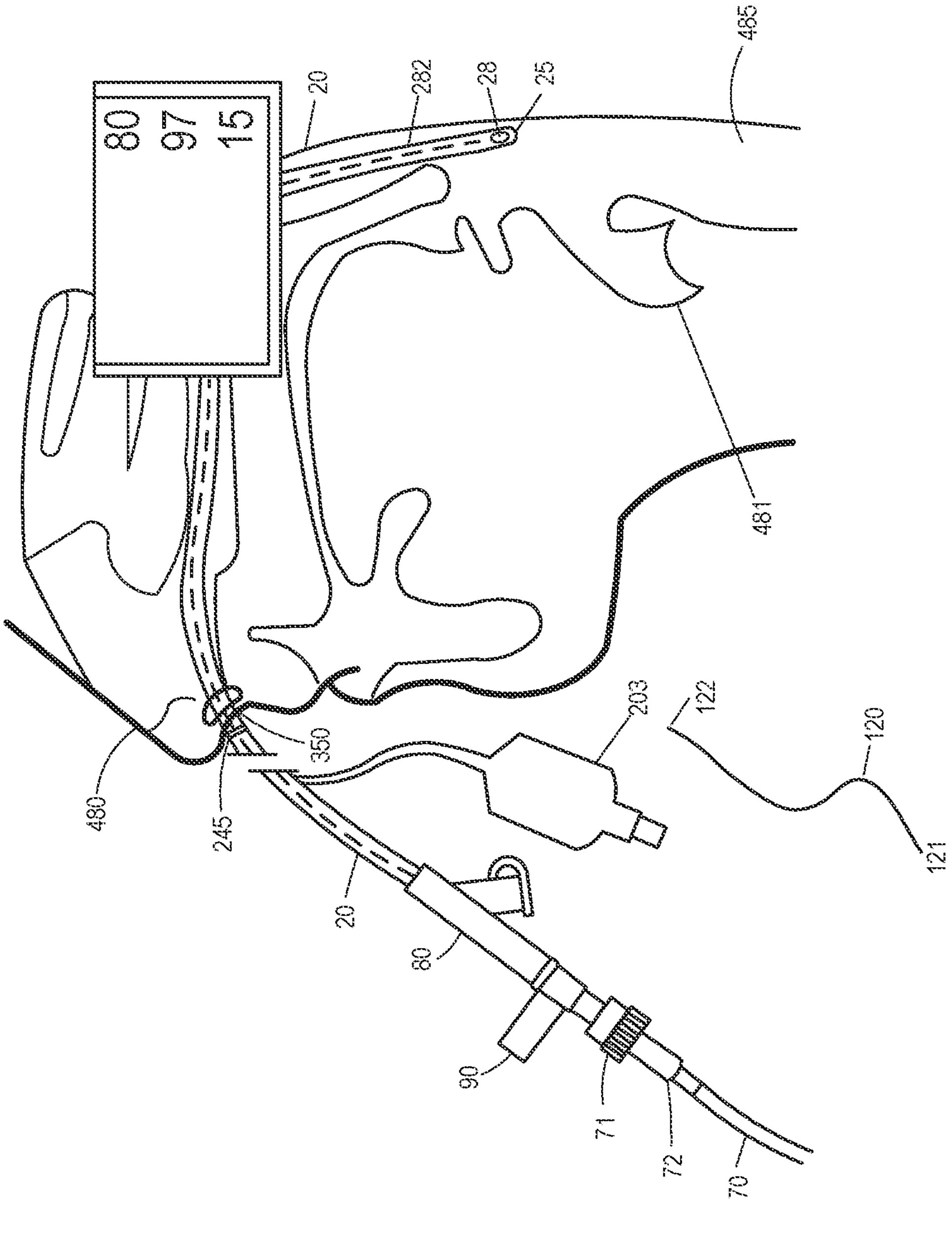
Figure 9C:
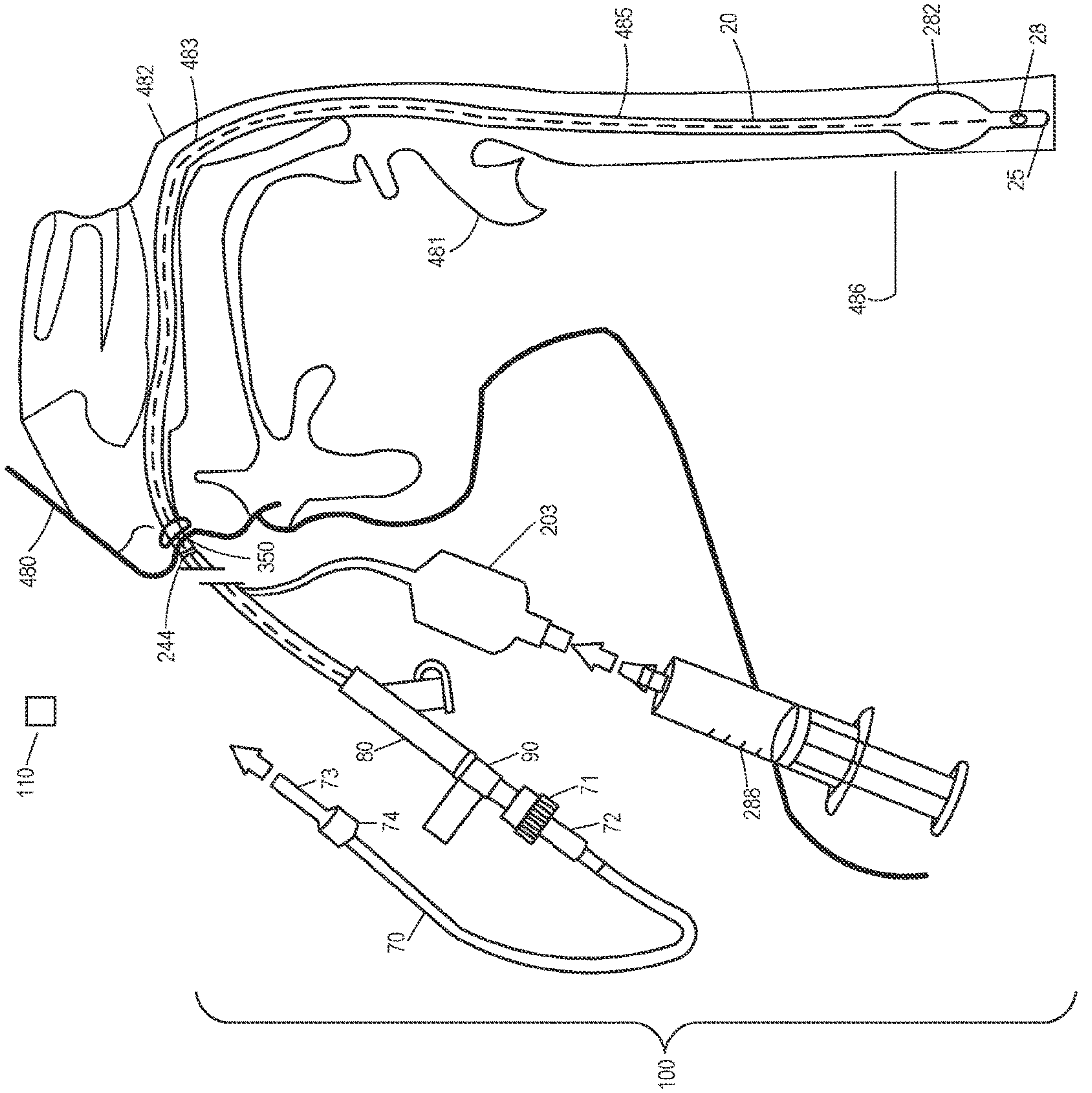
Figure 9D:
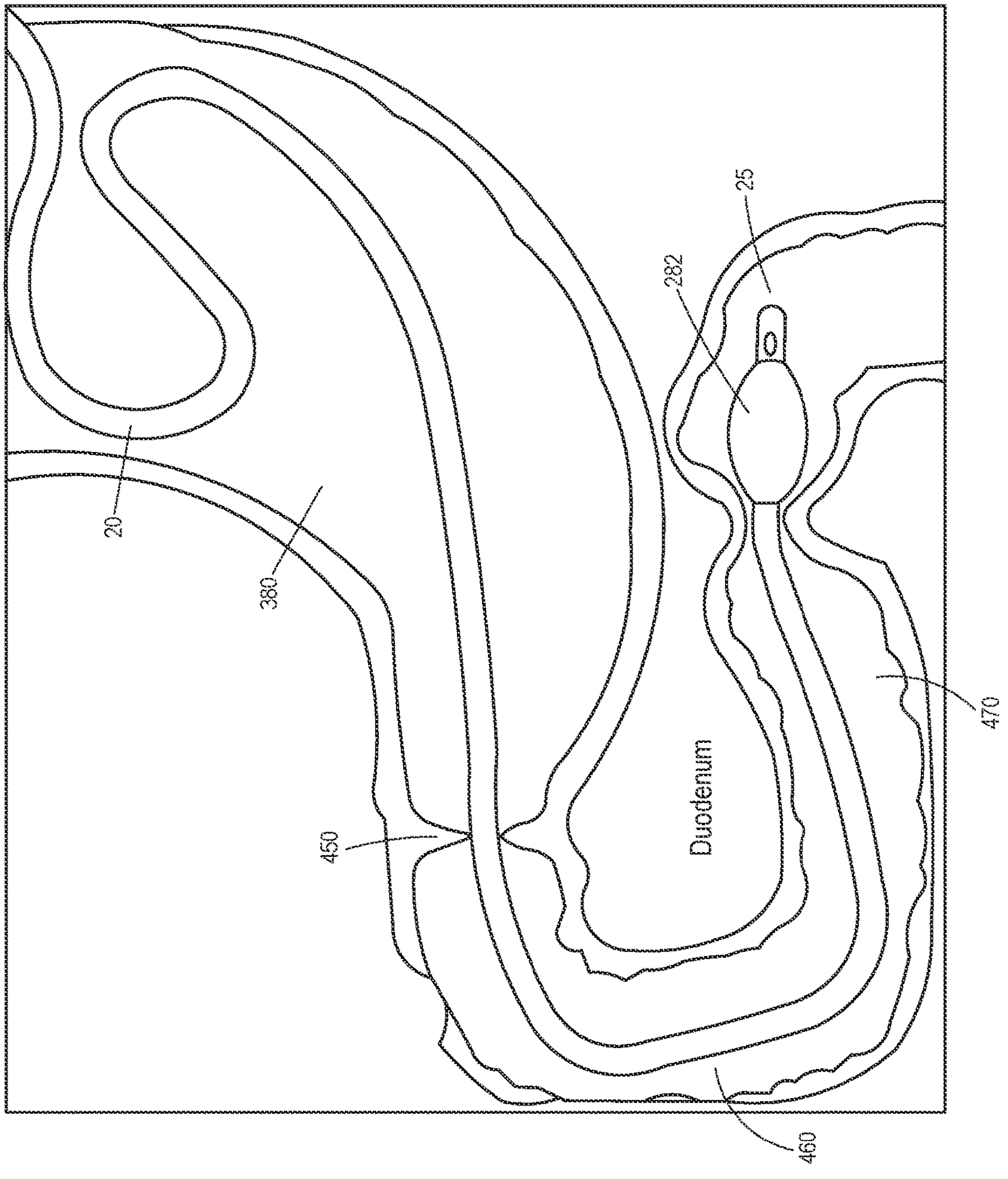

The exemplary feeding tube apparatus formed in Example 1 were used to intubate patients using the following procedure, which is shown in FIGS. 9A-9D. The following method steps were used:

$CO_2$ sampling line 70 was connected to stylet end hub 90 of removable stylet 30 and the side port 98 (if any) was capped;

numbing gel (not shown) was applied to the patient's nostril 350 using a provided cotton-tipped swab (not shown);

silk thread 120 was inserted into the distal end hole 28 of the catheter 20 (see, FIG. 9A);

lubricating gel (not shown) was applied to the catheter distal tip 25 and patient's nostril 350;

both ends 121/122 of silk thread 120 were held at a six o'clock position and the feeding tube 10 was inserted into the patient's nostril 350 and pushed toward the back of the head to the nasopharynx 483;

both ends 121/122 of the thread 120 were pulled to flex the distal tip 25 and guide the feeding tube 10 downward to the oropharynx;

the thread 120 was removed completely (see, FIG. 9B);

when the 18 cm mark 208/245 of the feeding tube 10 was at the patient's nostril 350, the patient 480 was asked to swallow in order to advance the feeding tube 10 into the esophagus 485 (see, FIG. 9B);

when the 30 cm mark 208/244 of the feeding tube 10 was at the patient's nostril 350, the tube tip 25 was positioned in the mid-esophagus region 486 of the patient (Note, coughing was intentionally absent in conscious patients.)(see, FIG. 9C);

sedated patients who were unresponsive to trachea misplacement were also connected to a pulse oximeter (not shown) and a $CO_2$ monitor 110 compatible with the provided $CO_2$ sampling line 70;

using a Luer Lock syringe 288, the tube distal end balloon 282 and the pilot balloon 203 were inflated with 6 cc of air and end-tidal $CO_2$ wave and pulse oximetry was observed;

detection of end tidal $CO_2$ wave or drop in pulse oximeter by 5 or more points indicated misplacement of feeding tube 10 in the trachea 481;

if misplacement in the trachea 481 was determined, the balloon 282 was deflated and the feeding tube 10 withdrawn from the patient 480 so that the 18 cm mark 208/245 was positioned at the patient's nostril 350 (i.e., to position the feeding tube 10 in a pre-esophagus region), and the above procedure was repeated; and if there was no detection of end tidal $CO_2$ wave or drop in pulse oximeter by 5 or more points (i.e., proper placement of the feeding tube 10 into the esophagus 485), the feeding tube 10 was advanced into the patient's stomach (FIG. 9D) while the inflatable balloon component 282 is inflated.

It should be understood that although the above-described feeding tube apparatus, kits and methods are described as "comprising" one or more components or steps, the above-described feeding tube apparatus, kits, and methods may "comprise," "consists of," or "consist essentially of" any of the above-described components, features or steps of the feeding tube apparatus, kits, and methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of or variations thereof" as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a feeding tube apparatus, kit and/or method that "comprises" a list of elements (e.g., components, features, or steps) is not necessarily limited to only those elements (or components or steps), but may include other elements (or components or steps) not expressly listed or inherent to the feeding tube apparatus, kit and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a feeding tube apparatus, kit and/or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described feeding tube apparatus, kits and/or methods may comprise, consist essentially of, or consist of any of the herein-described components and features, as shown in the figures with or without any feature(s) not shown in the figures. In other words, in some embodiments, the feeding tube apparatus, kits and/or methods of the present invention do not have any additional features other than those shown in the figures, and such additional features, not shown in the figures, are specifically excluded from the feeding tube apparatus, kits and/or methods. In other embodiments, the feeding tube apparatus, kits and/or methods of the present invention do have one or more additional features that are not shown in the figures.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A feeding tube apparatus (10) comprising:

a catheter (20) suitable for use with a removable stylet (30), said catheter (20) comprising a catheter proximal end (22), a catheter distal end (24) opposite said catheter proximal end (22), a catheter channel (26) extending along a length ($L_c$) of said catheter (20) from said catheter proximal end (22) towards said catheter distal end (24), and an inflatable balloon component (282) positioned along said catheter (20) proximate said catheter distal end (24);

a suction tube component (40) extending along a portion (271) of an outer surface (27) of catheter (20), said suction tube component (40) comprising (a) a suction tube proximate end (41), (b) a suction tube distal end (42), (c) a suction tube lumen (43) extending (i) between said suction tube proximate end (41) and said suction tube distal end (42), and (ii) along and external to said outer surface (27) of catheter (20), (d) one or more sidewall openings (44) positioned proximate said suction tube distal end (42), each of said one or more sidewall openings (44) extending through a sidewall of said suction tube component (40) from said suction tube lumen (43) to air or stomach fluid outside said suction tube component (40), (e) a port (45) at said suction tube proximate end (41), and (f) a vent channel (47) extending from a vent opening (49) within said suction tube lumen (43), thru and along a wall portion (401) of said suction tube component (40) to a vent tube (47'), and ending at a vent tube inlet (48), said suction tube component (40), when connected to a suction line, being capable of removing fluid from a patient's stomach by suctioning fluid into and through said one or more sidewall openings (44), through said suction tube lumen (43), and out of said port (45) while being vented via said vent channel (47); and a carbon dioxide ($CO_2$) sampling line (70) that is connectable to the catheter (20), said carbon dioxide ($CO_2$) sampling line (70) (a) comprising a sampling line distal end (72), a sampling line proximal end (74) opposite said sampling line distal end (72), a sampling line channel (76) extending along a length ($L_{SL}$) of said carbon dioxide ($CO_2$) sampling line (70) from said sampling line distal end (72) towards said sampling line proximal end (74), and (b) enabling detection of misplacement of the catheter (20) within a patient's trachea (481), further comprising a removable stylet (30), said removable stylet (30) comprising a stylet proximal end (31) and a stylet distal end (34) opposite said stylet proximal end (31), said stylet distal end (34) being sized so as to be insertable within (i) a catheter opening (23) at said catheter proximal end (22), and (ii) said catheter channel (26), wherein said removable stylet (30) comprises a stylet hub (90) at said stylet proximal end (31), said stylet hub (90) comprising a stylet hub proximal end (94), a stylet hub distal end (96), and a stylet channel that allows air flow through said stylet hub (90), said stylet hub distal end (96) being connectable to a proximal end (84) of feeding tube hub (80), wherein (a)(i) the removable stylet (30) or (ii) the catheter (20) further comprises a pH sensor (36) positioned along a distal end (24/34) thereof, (b) the removable stylet (30) further comprises an electromagnetic sensor (37) positioned along the stylet distal end (34), or (c) both (a) and (b).

2. A feeding tube apparatus (10) comprising:

a catheter (20) suitable for use with a removable stylet (30), said catheter (20) comprising a catheter proximal end (22), a catheter distal end (24) opposite said catheter proximal end (22), a catheter channel (26) extending along a length ($L_c$) of said catheter (20) from said catheter proximal end (22) towards said catheter distal end (24), and an inflatable balloon component (282) positioned along said catheter (20) proximate said catheter distal end (24); and a suction tube component (40) extending along a portion (271) of an outer surface (27) of catheter (20), said suction tube component (40) comprising (a) a suction tube proximate end (41), (b) a suction tube distal end (42), (c) a suction tube lumen (43) extending (i) between said suction tube proximate end (41) and said suction tube distal end (42), and (ii) along and external to said outer surface (27) of catheter (20), (d) one or more sidewall openings (44) positioned proximate said suction tube distal end (42), each of said one or more sidewall openings (44) extending through a sidewall of said suction tube component (40) from said suction tube lumen (43) to air or stomach fluid outside said suction tube component (40), (e) a port (45) at said suction tube proximate end (41), and (f) a vent channel (47) extending from a vent opening (49) within said suction tube lumen (43), thru and along a wall portion (401) of said suction tube component (40) to a vent tube (47'), and ending at a vent tube inlet (48), said suction tube component (40), when connected to a suction line, being capable of removing fluid from a patient's stomach by suctioning fluid into and through said one or more sidewall openings (44), through said suction tube lumen (43), and out of said port (45) while being vented via said vent channel (47), wherein both of said suction tube proximate end (41) and said suction tube distal end (42) are closed such that fluid removed from a patient's stomach is only removed through said one or more sidewall openings (44), through said suction tube lumen (43), and out of said port (45).

3. A feeding tube apparatus (10) comprising:

a catheter (20) suitable for use with a removable stylet (30), said catheter (20) comprising a catheter proximal end (22), a catheter distal end (24) opposite said catheter proximal end (22), a catheter channel (26) extending along a length ($L_c$) of said catheter (20) from said catheter proximal end (22) towards said catheter distal end (24), and an inflatable balloon component (282) positioned along said catheter (20) proximate said catheter distal end (24); and a suction tube component (40) extending along a portion (271) of an outer surface (27) of catheter (20), said suction tube component (40) comprising (a) a suction tube proximate end (41), (b) a suction tube distal end (42), (c) a suction tube lumen (43) extending (i) between said suction tube proximate end (41) and said suction tube distal end (42), and (ii) along and external to said outer surface (27) of catheter (20), and (d) a vent channel (47) extending from a vent opening (49) within said suction tube lumen (43), thru and along a wall portion (401) of said suction tube component (40) to a vent tube (47') and ending at a vent tube inlet (48), wherein said vent opening (49) is closer to said suction tube distal end (42) than said suction tube proximate end (41), and said vent tube (47') is closer to said suction tube proximate end (41) than said suction tube distal end (42), wherein said suction tube component (40) further comprises: (e) one or more sidewall openings (44) positioned proximate said suction tube distal end (42), each of said one or more sidewall openings (44) extending through a sidewall of said suction tube component (40) from said suction tube lumen (43) to air or stomach fluid outside said suction tube component (40), and (f) a port (45) at said suction tube proximate end (41), said suction tube component (40), when connected to a suction line, being capable of removing fluid from a patient's stomach by suctioning fluid into and through said one or more sidewall openings (44), through said suction tube lumen (43), and out of said port (45) while being vented via said vent channel (47).

* * * * *